US008156505B2

(12) United States Patent
Venkatanna et al.

(10) Patent No.: US 8,156,505 B2
(45) Date of Patent: Apr. 10, 2012

(54) PROTOCOL PROCESSING INCLUDING CONVERTING MESSAGES BETWEEN SOAP AND APPLICATION SPECIFIC FORMATS

(75) Inventors: Kumar Balepur Venkatanna, Bangalore (IN); Subrahmanya Sreenivasan Venkateshaiah, Bangalore (IN)

(73) Assignee: Infosys Limited, Bangalore (IN)

( * ) Notice: Subject to any disclaimer, the term of this patent is extended or adjusted under 35 U.S.C. 154(b) by 1014 days.

(21) Appl. No.: 11/814,900

(22) PCT Filed: Jan. 27, 2005

(86) PCT No.: PCT/IN2005/000032
§ 371 (c)(1),
(2), (4) Date: Jul. 31, 2007

(87) PCT Pub. No.: WO2006/080026
PCT Pub. Date: Aug. 3, 2006

(65) Prior Publication Data
US 2008/0098405 A1 Apr. 24, 2008

(51) Int. Cl.
*G06F 9/54* (2006.01)
*G06F 9/44* (2006.01)
(52) U.S. Cl. .................. 719/313; 719/315; 717/168
(58) Field of Classification Search .................. None
See application file for complete search history.

(56) References Cited

U.S. PATENT DOCUMENTS

| 7,007,094 | B1 * | 2/2006 | Linderman | 709/230 |
| 7,085,841 | B2 * | 8/2006 | Edwards et al. | 709/230 |
| 7,136,913 | B2 * | 11/2006 | Linderman | 709/223 |
| 7,194,733 | B2 | 3/2007 | Ringseth et al. | |
| 7,246,358 | B2 * | 7/2007 | Chinnici et al. | 719/315 |
| 7,392,237 | B2 | 6/2008 | Pratt | |
| 7,467,391 | B2 * | 12/2008 | Myllymaki et al. | 719/320 |
| 7,769,825 | B2 * | 8/2010 | Karakashian et al. | 709/219 |
| 2002/0107992 | A1 * | 8/2002 | Osbourne et al. | 709/310 |

(Continued)

FOREIGN PATENT DOCUMENTS
WO  WO 2006/080026  8/2006

OTHER PUBLICATIONS

"Simple Object Access Protocol (SOAP) 1.1", May 8, 2000, W3C, pp. 1-30.*

(Continued)

*Primary Examiner* — Qing Wu
(74) *Attorney, Agent, or Firm* — Klarquist Sparkman, LLP

(57) ABSTRACT

The SPD according to exemplary embodiments of the invention may interface with different buses and computer system architectures to enable deployment in a wide variety of devices. Heterogeneous network (300) using SPDs in various computing devices. Desktop computers (302), mobile systems (such as cell phones) (304), mainframes (306), workstations (308), PDA systems (310) and other devices may be operatively connected to a network (such as the Internet or an Intranet). These devices may include SPDs (312) to enable web services to be provided among these devices. They may also communicate with some devices that do not include SPDs (such as the PC Desktop System (302) and Mobile System (304) in FIG. 3). These devices would require the use of a SOAP software toolkit for the particular platform, because they do not include an SPD. The SPDs could have different designs in different systems, while they share a common SOAP engine to provide a consistent and efficient SOAP processing capability.

24 Claims, 22 Drawing Sheets

U.S. PATENT DOCUMENTS

| | | | |
|---|---|---|---|
| 2003/0023633 | A1 | 1/2003 | Ross |
| 2003/0041302 | A1 | 2/2003 | McDonald |
| 2003/0105884 | A1* | 6/2003 | Upton .......................... 709/318 |
| 2003/0137693 | A1 | 7/2003 | Nishio |
| 2003/0177270 | A1 | 9/2003 | Noda et al. |
| 2003/0200349 | A1 | 10/2003 | Hansen |
| 2003/0204612 | A1 | 10/2003 | Warren |
| 2003/0212690 | A1 | 11/2003 | Surma et al. |
| 2004/0054690 | A1 | 3/2004 | Hillerbrand et al. |
| 2004/0221001 | A1* | 11/2004 | Anagol-Subbarao et al. .......................... 709/203 |
| 2005/0044197 | A1 | 2/2005 | Lai |
| 2005/0050228 | A1 | 3/2005 | Perham et al. |

OTHER PUBLICATIONS

International Preliminary Report, International Application No. PCT/IN2005/000032, 4 pages, Jul. 31, 2007.

Written Opinion, International Application No. PCT/IN05/00032, 3 pages, May 3, 2006.

SOAP Version 1.2 Part 0: Primer, W3C Recommendation Jun. 24, 2003, printed on Feb. 11, 2008 from http://www.w3.org/TR/2003/REC-soap12-part0-20030624/, 48 pages.

SOAP Version 1.2 Part 1: Messaging Framework, W3C Recommendation Jun. 24, 2003, printed on Feb. 11, 2008 from http://www.w3.org/TR/2003/REC-soap12-part1-20030624/, 52 pages.

SOAP Version 1.2 Part 2: Adjuncts, W3C Recommendation Jun. 24, 2003, printed on Feb. 11, 2008 from http://www.w3.org/TR/2003/REC-soap12-part2-20030624/, 28 pages.

W3C Architecture Domain, Extensible Markup Language (XML), printed on Feb. 11, 2008 from http://web.archive.org/web/20021108134350/www.w3.org/XML/, 4 pages.

XML Schema Part 0: Primer, W3C Recommendation, May 2, 2001, printed on Feb. 11, 2008 from http://www.w3.org/TR/2001/REC-xmlschema-0-20010502/, 61 pages.

XML Schema Part 1: Structures Second Edition, W3C Recommendation, Oct. 28, 2004, printed on Feb. 11, 2008 from http://www.w3.org/TR/xmlschema-1/, 106 pages.

XML Schema Part 2: Datatypes Second Edition, W3C Recommendation Oct. 28, 2004, printed on Feb. 11, 2008 from http://www.w3.org/TR/xmlschema-2/, 98 pages.

Web Services Description Language (WSDL) 1.1, W3C Note Mar. 15, 2001, printed on Feb. 11, 2008 from http://www.w3.org/TR/wsdl.html, 30 pages.

UDDI, printed on Feb. 11, 2008 from http://web.archive.org/web/20031023164329/http://uddi.org/, 1 page.

OASIS UDDI Specifications TC—Committee Specifications, printed on Feb. 11, 2008 from http://web.archive.org/web/20030622212415/www.oasis-open.org/committees/uddi-spec/doc/tcspecs.htm, 4 pages.

OASIS UDDI Version 3.0, UDDI Spec Technical Committee Specification, Jul. 19, 2002, printed on Feb. 11, 2008 from http://web.archive.org/web/20030603200907/uddi.org/pubs/uddi-v3.00-published-20020719.htm, 321 pages.

Expand Networks—Press Releases Archive, "Expand Networks Accelerates Delivery of Web Services," Sep. 4, 2002, HTTP://www.expand.com/news/pressReleases/press_archivesDrill.asp?rid=9%2F%2F02+..., 2 pages.

DataPower: XA35: XML Performance Applications, DataPower Intelligent XML-Aware Network Infrastructure, Newsroom, printed Nov. 20, 2003 from http://www.datapower,com/products/app_xs35.html, 2 pages.

DataPower: XS40: High Performance XML Security Applications, DataPower Intelligent XML-Aware Network Infrastructure, Newsroom, printed Nov. 20, 2003 from http://www.datapower.com/products/app_xs40.html, 2 pages.

XML Acceleration Product Review Highlights DataPower's Lead in XSLT, DataPower Intelligent XML-Aware Network Infrastructure, Newsroom, Oct. 30, 2002, http://www.datapower.com/newsroom/pr_103002_review.html, 2 pages.

DataPower Provides First WS-I Compliant SOAP-Based Interface for Managing XML-A, DataPower Intelligent XML-Aware Network Infrastructure, Newsroom, Aug. 12, 2003, http://www.datapower.com/newsrom/pr_081203_SOAP.html, 2 pages.

Soap C++ Web Services, Recent News gSOAP, printed Dec. 10, 2003 from http://www.cs.fsu.edu/~engelen/soapmain.html, 8 pages.

DataPower: About Us, Company Overview, printed Nov. 20, 2003 from http://www.datapower.com/about/index.html, 2 pages.

PC Magazine, Understanding SOAP—A Closer Look, printed Dec. 10, 2003 from http://www.pcmag.com/article2/0,4149,1176695,00.asp, 5 pages.

PC Magazine, Understanding SOAP—A Different Twist, printed Dec. 10, 2003 from http://www.pcmag.com/article2/0,4149,1176696,00.asp, 4 pages.

Web Services: SOAP Engine, Developer Connection, printed Dec. 10, 2003 from http://developer.apple.com/documentation/WebObjects/Web_Services/Introduction/chapt..., 3 pages.

Non-Final Office Action, U.S. Appl. No. 10/965,246, 17 pages, Oct. 10, 2008.

* cited by examiner

PROTOCOL PROCESSING INCLUDING CONVERTING MESSAGES BETWEEN SOAP AND APPLICATION SPECIFIC FORMATS

FIELD OF THE INVENTION

The field of the present invention relates to protocol processing for distributed computing in a network. More specifically, the field of the present invention relates to a device and method for processing Simple Object Access Protocol (SOAP) and/or other protocols for distributed computing over the World Wide Web, intranets or other networks.

BACKGROUND OF THE INVENTION

Web Services is considered as the emerging technology that enables business-to-business automation. Web services has been described as a software component that employ one or more of the following technologies—SOAP, WSDL and UDDI—to perform distributed computing. Use of any of the basic technologies—SOAP, WSDL or UDDI—constitutes a Web service. Use of all of them is not required.

The three protocols introduced in the above description are: (1) SOAP, Simple Object Access Protocol, (2) WSDL, Web Services Description Language, and (3) UDDI, Universal Description, Discovery and Integration.

Extensible Markup Language forms the basis of these three fundamental technologies. XML is the acronym for Extensible Markup Language. XML is a simple, text based data description language. The extensible nature of this markup language has resulted in its tremendous growth and adoption in the Information Technology industry. SOAP, WSDL and UDDI use extensions of XML to provide the layers of Web Services. In the following paragraphs, we provide a description of SOAP, WSDL and UDDI:

SOAP, Simple Object Access Protocol. SOAP is an acronym for Simple Object Access Protocol. SOAP is a protocol based on XML for exchanging information in a decentralized distributed environment among the communicating applications.

WSDL, Web Services Description Language. WSDL is an acronym for Web Services Description Language. WSDL is an XML document that contains the description of Web Services as well as the means of accessing them. The descriptions of Web Services are entered in the WSDL document with the help of seven predefined XML markup tags.

UDDI, Universal Description, Discovery and Integration. UDDI is an acronym for Universal Description, Discovery and Integration. UDDI is an XML based specification for establishing business registries that store business and services related information. These business registries help other businesses and individuals to query and search for required information. Registries thus promote business-to-business among interested parties.

SOAP and Its Relevance. SOAP has been designed to be independent of transport protocol. It can be transported over HTTP, SMTP, FTP, etc. In the present web services environment, applications communicating using SOAP most often use HTTP as the transport protocol. This is due to the fact that HTTP is the preferred transport protocol in the web environment.

In the Web Services scenario it is possible that the communicating applications could be developed using different programming languages, deployed on disparate systems, and running on different operating environments. These applications interchange information in SOAP format. SOAP, therefore may be used to provide a cornerstone of interoperability.

The communicating applications participating in the Web Services environment therefore require a facility to convert the application specific information to SOAP format and vice versa.

In conventional systems, the communicating applications in the Web Services scenario use "software tools" to convert the information to SOAP format. Apache Axis from Apache.org, SOAP Toolkit from Microsoft, Web Services Toolkit from IBM, and JWSDP from Sun are some examples of software tools relating to SOAP. Web Services applications may interact with these software tools to generate SOAP. The SOAP information is then transported using a transport protocol such as HTTP. This SOAP message is received by the target system and the software tools at the target system may then convert the SOAP to the format required by the target application.

The use of the SOAP protocol may be processing intensive. In certain versions of the SOAP protocol, binary and other compressed application specific formats may be required to be converted into long text strings for transmission in a platform independent SOAP format, which adds to the processing overhead. This aside, SOAP may require different software toolkits and implementations on different platforms. For instance, a SOAP toolkit from one software vendor may convert SOAP to Java specific formats, while another toolkit may convert SOAP to C++ specific formats. In large heterogeneous networks, it is difficult to ensure interoperability and widespread enablement of web services with different toolkits being used across a wide variety of platforms and applications. What is desired is a device and method for implementing SOAP and/or other protocols with improved processing efficiency and in a manner that allows consistent widespread deployment of the same implementation in different systems across a large heterogeneous network.

SUMMARY OF THE INVENTION

Aspects of the present invention relate to a device and method for protocol processing. In particular, aspects of the present invention provide a hardware device to accelerate the processing of SOAP and/or other protocols that use an envelope or other container for messages to be exchanged in a heterogeneous network. Such protocols may include the use of namespaces which define the tags used in the message, and schema definitions or an appropriate encoding, which define the grammar. In this document, we will, for the sake of convenience, refer to the extensible schema definitions (XSD) as an example of schema definitions in general. SOAP messages of both document style and remote procedure call (RPC) style communication may be supported by embodiments of the invention.

Aspects of the present invention may provide a SOAP processing device (SPD) or other protocol processing device implemented in one or more integrated circuits. The device may provide circuitry for, among other things, an I/O block, parser/validator, application code handler and protocol generator. Repetitive operations are implemented in circuitry such as comparison of tags and creation of repetitive structures (such as envelope elements or other container structures, header elements, and body elements). Circuitry may also be used to accelerate conversion of SOAP or other protocols into common application specific data formats such as Java, C++, and other application specific object access.

In an exemplary embodiment, the design of the device may use a set of selectable "IP Cores" and the domain-neutral nature of the SPD will, in fact, be affected by these selectable sets of hardware IP cores. These IP cores may be implemented as a built-in PCI interface, interface to a Wireless Access Protocol (WAP) or any such logic pertaining to any other communications Digital Signal Processor (DSP). The same general device architecture may be used with different IP cores to support different interfaces. The device may be targeted at a particular system architecture and include a specific interface for that system such as the PCI or PCI Express bus interface. Alternatively, in some embodiments, multiple interfaces may be supported. The interfaces may be selectively enabled or disabled for use in different systems. In some embodiments, multiple interfaces (such as PCI and PCI Express) may be enabled to allow the device to operate in a bridge configuration.

Aspects of the present invention may provide for an integrated circuit device for converting a message from a SOAP format to an application specific format, including: circuitry for receiving the message in the SOAP format and for providing the message in the application specific format; circuitry for determining whether the message is in the SOAP format or the application specific format; and circuitry for converting the message from the SOAP format into the application specific format.

Aspects of the present invention may also provide for circuitry and/or software for contacting a UDDI server for discovering the published web service endpoints. Aspects of the present invention may also provide for circuitry and/or software to decode the WSDL document published in the UDDI server in a comprehensive manner and also incorporate circuitry and/or software for connecting to the same.

Aspects of the present invention may also provide for an integrated circuit device for converting a message from an application specific format to a SOAP format, including: circuitry for receiving the message in the application specific format and for providing the message in the SOAP format; circuitry for determining whether the message is in the SOAP format or the application specific format; circuitry for converting elements in the message from the application specific format into the SOAP format; circuitry for creating an envelope element, header element, body element, header entry and body entry from the elements converted from the message in the application specific format; and circuitry for sequencing and constructing the message in the SOAP format using the envelope element, the header element, the body element, the header entry and the body entry.

Aspects of the present invention may also provide software for processing SOAP and/or other protocols across multiple applications using different application specific formats. In an exemplary embodiment, software may be used to convert a message from a SOAP format to one of several application specific formats, including: a module for receiving the message in the SOAP format and for providing the message in the application specific format; a module for determining whether the message is in the SOAP format or the application specific format; and a module for converting the message from the SOAP format into the application specific format. In another exemplary embodiment, software may be used to convert a message from one of several application specific formats into a SOAP format, including: a module for receiving the message in the application specific format and for providing the message in the SOAP format; a module for determining whether the message is in the SOAP format or the application specific format; a module for converting elements in the message from the application specific format into the SOAP format; a module for creating an envelope element, header element, body element, header entry and body entry from the elements converted from the message in the application specific format; and a module for sequencing and constructing the message in the SOAP format using the envelope element, the header element, the body element, the header entry and the body entry. In an exemplary embodiment, a single software program may be used to support SOAP and/or similar protocol processing for multiple disparate applications and formats on a single system. The software may reside in memory as a dynamically linkable module, driver or other software program or may reside on a separate card, blade or peripheral device.

Embodiments of the present invention may use the above aspects individually or in combination. For instance, a protocol processing device may use a combination of circuitry and software (which may also include firmware) to convert messages to and/or from SOAP and/or other formats. Multiple applications using different application specific formats may be supported by a single SOAP processor, whether implemented as hardware, software or a combination of both hardware and software.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

An exemplary embodiment of the present invention provides an application specific integrated circuit (ASIC), System-on-Chip (SOC), microprocessor, digital signal processor (DSP) or other device for converting messages in SOAP format into an application specific format as well as converting a message in an application specific format into SOAP format. Below, we refer to an embodiment using an integrated circuit (IC) which is intended to include embodiments using ASICs, SOCs, microprocessors, DSPs and/or other devices. The IC may be connected to a computer system either internally or externally. For instance, in one embodiment, this SOAP processing device (SPD) may be connected to the peripheral system bus of an Intel architecture personal computer. In this embodiment, the SPD is operatively connected to other system components over the bus, including a network interface card (NIC) for communicating with a network (such as the Internet or an Intranet), the host processor, host processor chip set, and host memory. Application software and the operating system (which may be Microsoft Windows, Linux or other operating system) are executed on the host processor, but may send and receive messages by making requests to the SPD. The SPD can receive a message in application specific format (such as C++, Java, Windows or, other data formats) from application software or the operating system and generate a message in SOAP format. The SPD can also receive a message in SOAP format from a remote computer system over the network (e.g., through the NIC) and convert the message into an application specific format to be used by application software or the operating system on the local computer system. Driver software may be installed (whether as part of the operating system or separately) to facilitate the routing of messages to and from the SPD. In alternate embodiments, the computer system could be an IBM AIX workstation system, a Sun Solaris system, a Nokia mobile system, a Palm PDA, or any such system capable of communicating in a Web Services environment.

Figure 1:
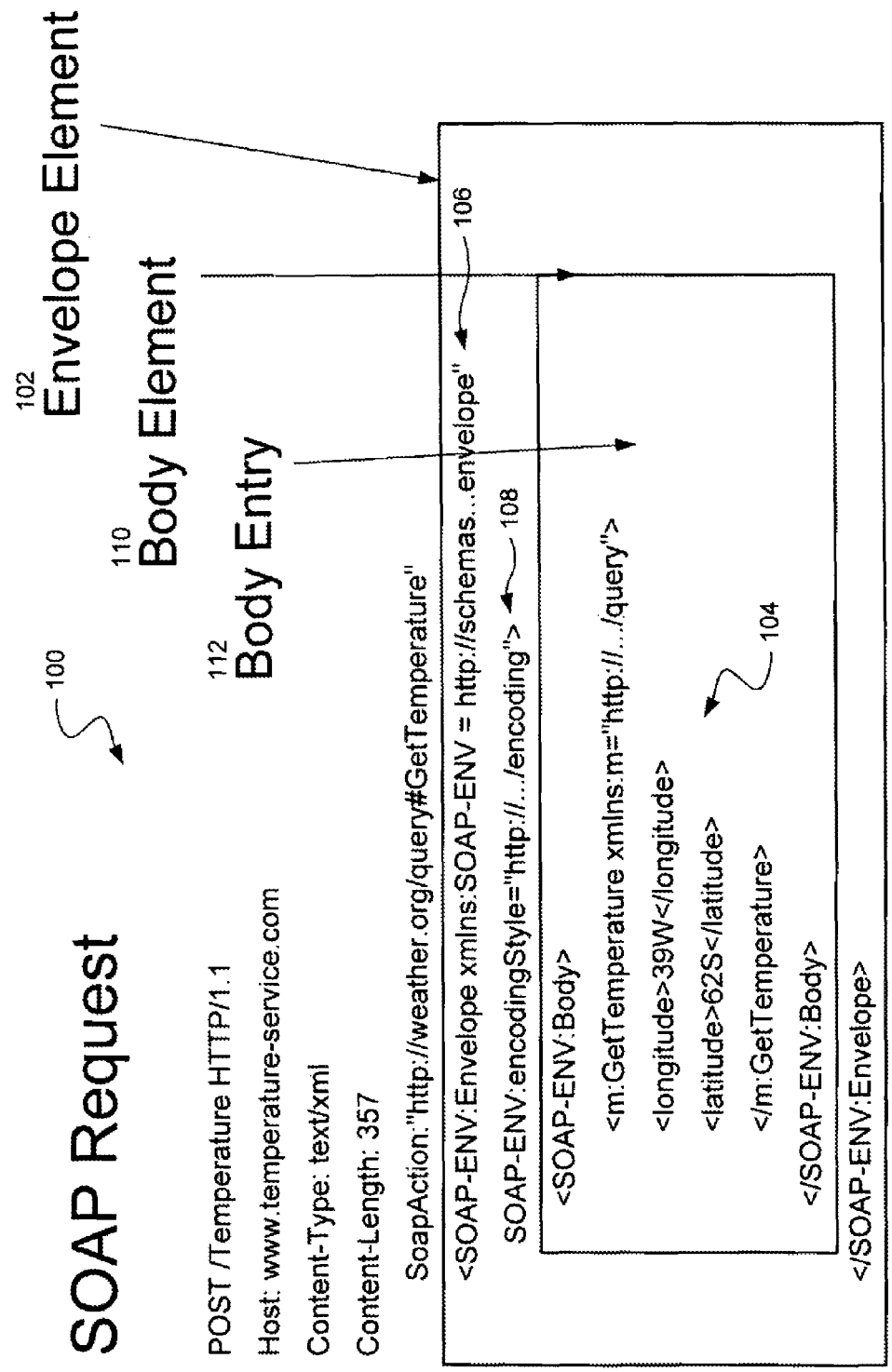
FIG. 1 illustrates an exemplary SOAP request that may be processed using embodiments of the present invention.

FIG. 1 shows a SOAP request 100 that may be processed by the SPD according to an embodiment of the present invention. The SOAP request 100 includes an envelope element 102 that encapsulates the message 104 and provides information about how to process the message 104. The SOAP request 100 may have an optional header. In FIG. 1, a schema 106 ("http://.../envelope/") and appropriate encoding style 108 ("http://.../encoding/") are specified. The request 100 also includes a body element 110 and body entry 112 which includes the body of the message. In this example, the message 104 includes a request to retrieve the temperature at a given longitude and latitude. This message is an example of a remote procedure call style SOAP Message to provide an API. In this example, the procedure "GetTemperature" is being called, and the parameters "longitude" and "latitude" are provided. The envelope element 102, body element 110, procedure and parameters are all delineated by start tags and end tags in brackets (< >). Each end tag includes a forward slash "/" after the first bracket. In order to be properly formed, the tags must comply with the applicable namespace and its grammar must conform to the schema indicated for the message.

Figure 2:
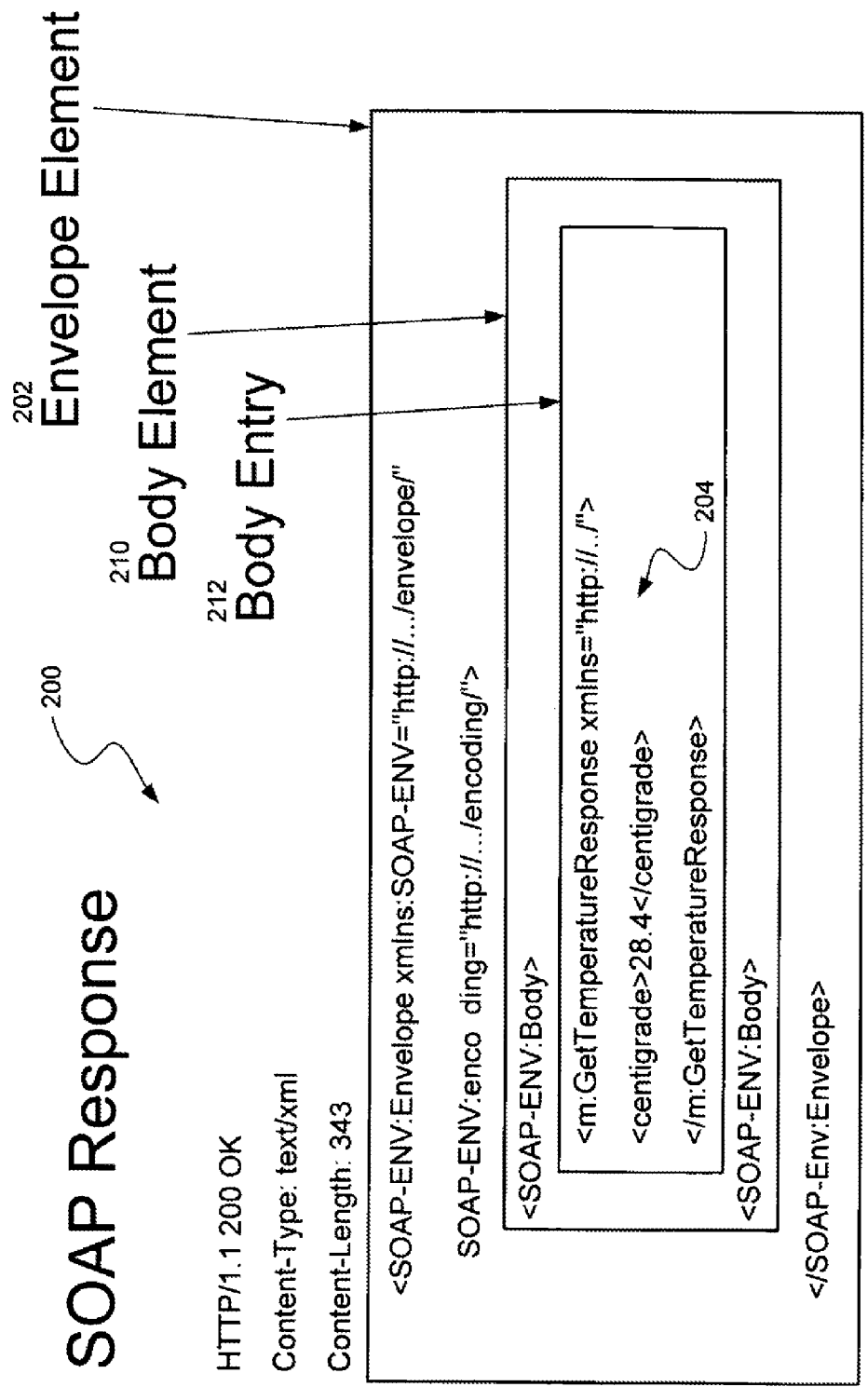
FIG. 2 illustrates an exemplary SOAP response that may be processed using embodiments of the present invention.

FIG. 2 shows a SOAP response 200 that may be processed by an SPD according to an embodiment of the present invention. As with FIG. 1, the message 204 includes an envelope element 202 and a body element 210. The body entry 212 indicates the response "GetTemperatureResponse" and the return parameter "centigrade" which has a value indicating the requested temperature.

The SPD according to embodiments of the present invention includes circuitry to accelerate processing of repetitive operations used to parse, validate and convert messages between SOAP and application specific formats. The SPD includes circuitry, local buffers, registers and pointers to marshall and unmarshall XML in an efficient manner. In addition, the SPD may selectively send operations to driver software for execution. If a particular version of SOAP (or an application specific format) is not supported, the SPD may send the message to the driver software before generating an error message or fault. The driver can easily be updated to support the most recent specifications for any operations that are not supported in the SPD IC.

While the exemplary embodiments of the present invention process the SOAP protocol, other protocols may be supported in alternative embodiments of the present invention. In particular, other protocols for encapsulating messages in a markup language may be used. The processing device would include circuitry for efficiently parsing the container (e.g., envelope) for the message, the tags and grammar, and/or the conversion of application specific formats into the markup language and conversely.

Figure 3:
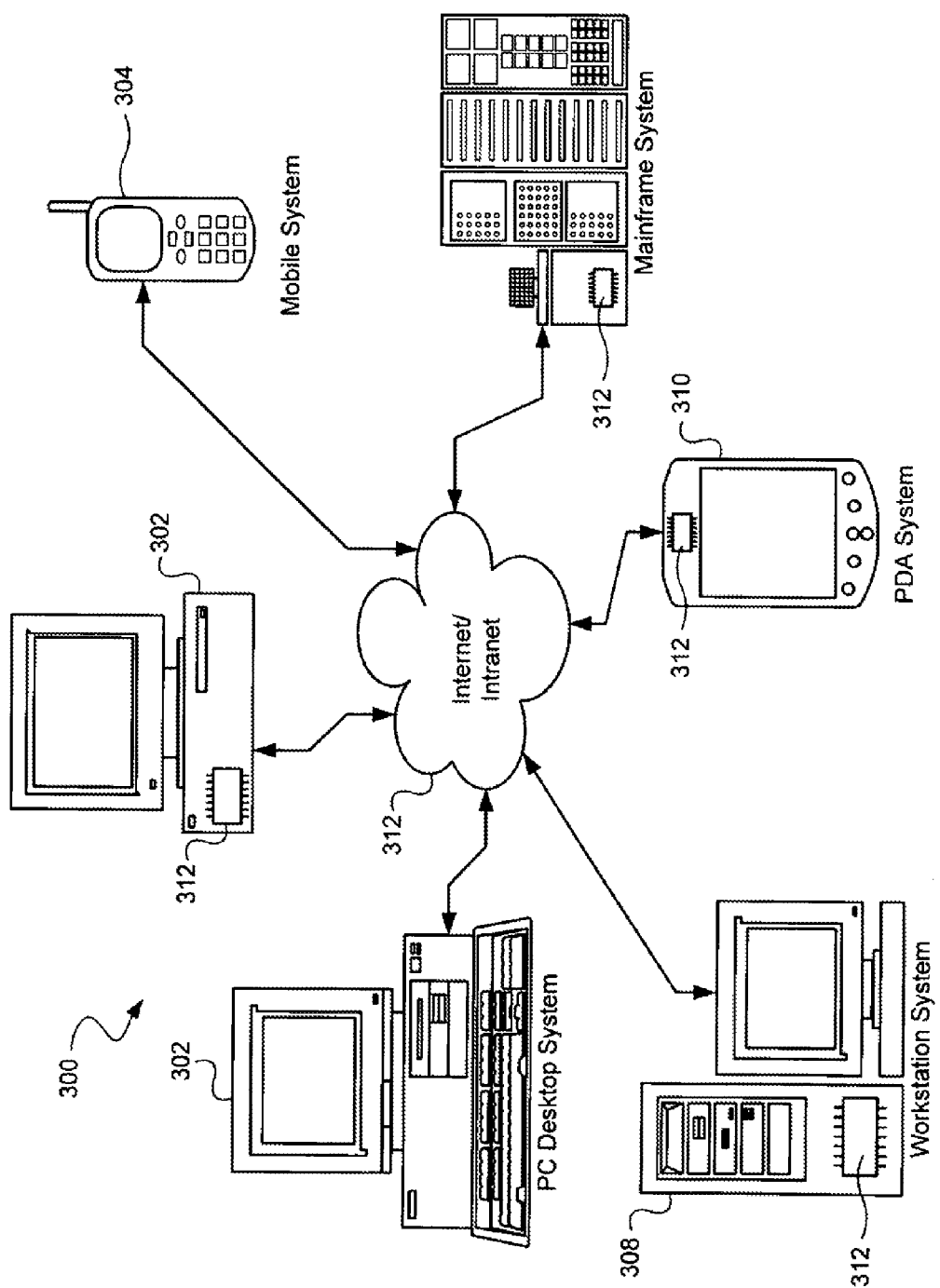
FIG. 3 is a diagram of a heterogeneous network using SOAP processing devices in accordance with an embodiment of the present invention.

The SPD according to exemplary embodiments of the invention may interface with different buses and computer system architectures to enable deployment in a wide variety of devices. FIG. 3 illustrates a heterogeneous network 300 using SPDs in various computing devices. As shown in FIG. 3, desktop computers 302, mobile systems (such as cell phones) 304, mainframes 306, workstations 308, PDA systems 310 and other devices may be operatively connected to a network (such as the Internet or an Intranet). These devices may include SPDs 312 to enable web services to be provided among these devices. They may also communicate with some devices that do not include SPDs (such as the PC Desktop System 302 and Mobile System 304 in FIG. 3). These devices would require the use of a SOAP software toolkit for the particular platform, because they do not include an SPD. The SPDs could have different designs in different systems, while they share a common SOAP engine to provide a consistent and efficient SOAP processing capability.

Figure 4:
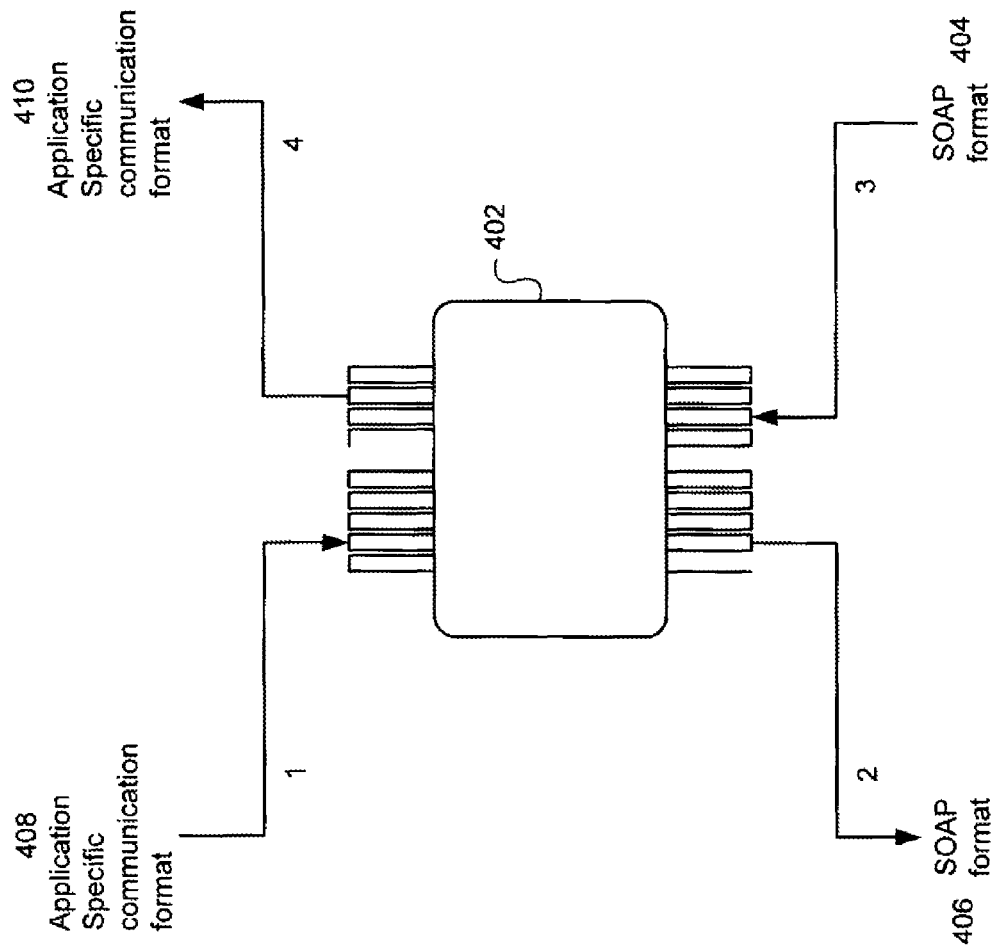
FIG. 4 illustrates a SOAP processing device according to an embodiment of the present invention.

FIG. 4 is a conceptual representation showing functional interfaces of the SPD 402, which do not necessarily have to be mapped to its input/output pins. These functional interfaces correspond to the nature of data that the SPD works with, namely: SOAP format input 404, SOAP format output 406, native application input 408 and native application output 410.

Figure 5:
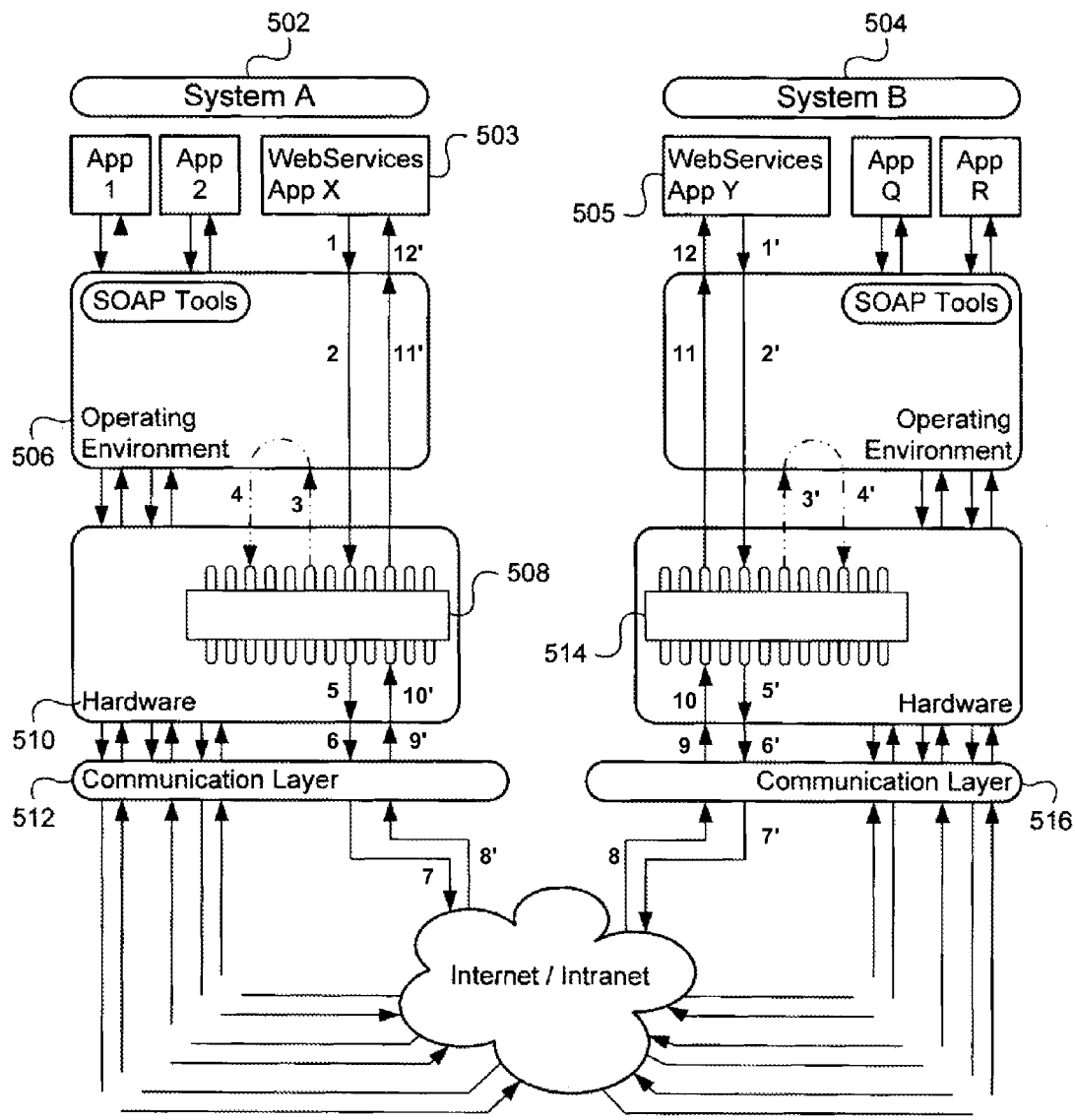
FIG. 5 is a block diagram illustrating communication between two disparate systems powered using SOAP processing devices according to embodiments of the present invention.

FIG. 5 shows a block diagram of two systems, System A 502 and System B 504, that communicate with one another using SPDs. Each system may support multiple applications. In FIG. 5, System A 502 is supporting applications App 1 and App 2 while System B 504 is hosting App Q and App R. These applications could be running locally or communicating across the internet or an intranet. These applications may or may not be using SOAP for communication purposes. However, the application marked as "Web Services App X" 503 on System A 502 and the application marked "Web Services App Y" 505 on System B 504 are applications running in the Web Services environment. The communication between these two applications is bi directional and is shown in FIG. 5 with the help of labeled arrows.

The way the SPDs in this system are designed to work is presented in two parts: (1) converting from application specific format to SOAP; and (2) converting from SOAP to an application specific format.

The following describes the conversion from application specific format to SOAP. System A 502 is a computer system that is intending to communicate with another System B 504. Both these systems are equipped with SPDs. The Web Services enabled application "Web Services App X" 503 on System A 502 initiates communication with the "Web Services App Y" 505 on System B 504 for carrying out a particular task. The operating environment 506 forwards the application's request to the SPD 508, as this is a Web Services invocation. The SPD 508, at this point of time, could optionally make a call to any other application running on System A 502, before converting the information to the SOAP format. This SOAP message would then be forwarded to the other System B 504 via a transport protocol such as HTTP.

The communication from "Web Services App X" 503 to "Web Services App Y" 505 can be traced through a set of arrows labeled from 1 to 12. The Web Services invocation by "Web Services App X" 503 is shown by arrows 1 and 2. In this case, the invocation is forwarded to SPD 508 on the hardware layer 510. The SPD 508 optionally could invoke one or more application in the operating environment layer 506 (shown by arrows 3 and 4). Finally, the SPD 508 generates SOAP message and then forwards it to the communication layer 512, shown by arrows 5 and 6. This SOAP request is then forwarded by the communication layer 512 using a transport protocol such as HTTP. This is shown by arrow 7.

The following describes the conversion from SOAP to an application specific format. The "Web Services App Y" 505 in System B 504 receives the communication from "Web Services App X" 503 of System A 502. This communication is in SOAP format and therefore the request is forwarded to the SPD 514 on System B 504. The SPD 514 may optionally communicate with any other application on System B 504 before converting SOAP message to the application specific format in System B 504. Once the message is converted to the format required by "Web Services App Y" 505, the information is delivered.

The response from "Web Services App Y" 505 can be traced through a set of arrows labeled from 1' to 12'. System B 504 receives the SOAP request through the communication layer 516. This is shown with the help of arrows 8, 9 and 10. This request reaches the SPD 514 on the System B side and the SPD 514 converts the SOAP message to the format required by the application "Web Services App Y" 505 and the request is forwarded. This is shown by arrows 11 and 12.

In FIG. 5, arrows 5 to 10 represent SOAP invocation and it is a SOAP request to System B 504 in this particular case. Similarly, arrows 5' to 10' depict a SOAP response to System A 502. The arrows marked 3, 4 and 3', 4' are "optional calls" that the SPD 514 might invoke to satisfy certain criteria of ensuring SOAP Processing. The communications represented by arrows 1, 2 & 11', 12' on System A 502 side and 1', 2' and 11, 12 on the System B 504 side are the application specific communication between Web Services application and the SPD.

Figure 6:
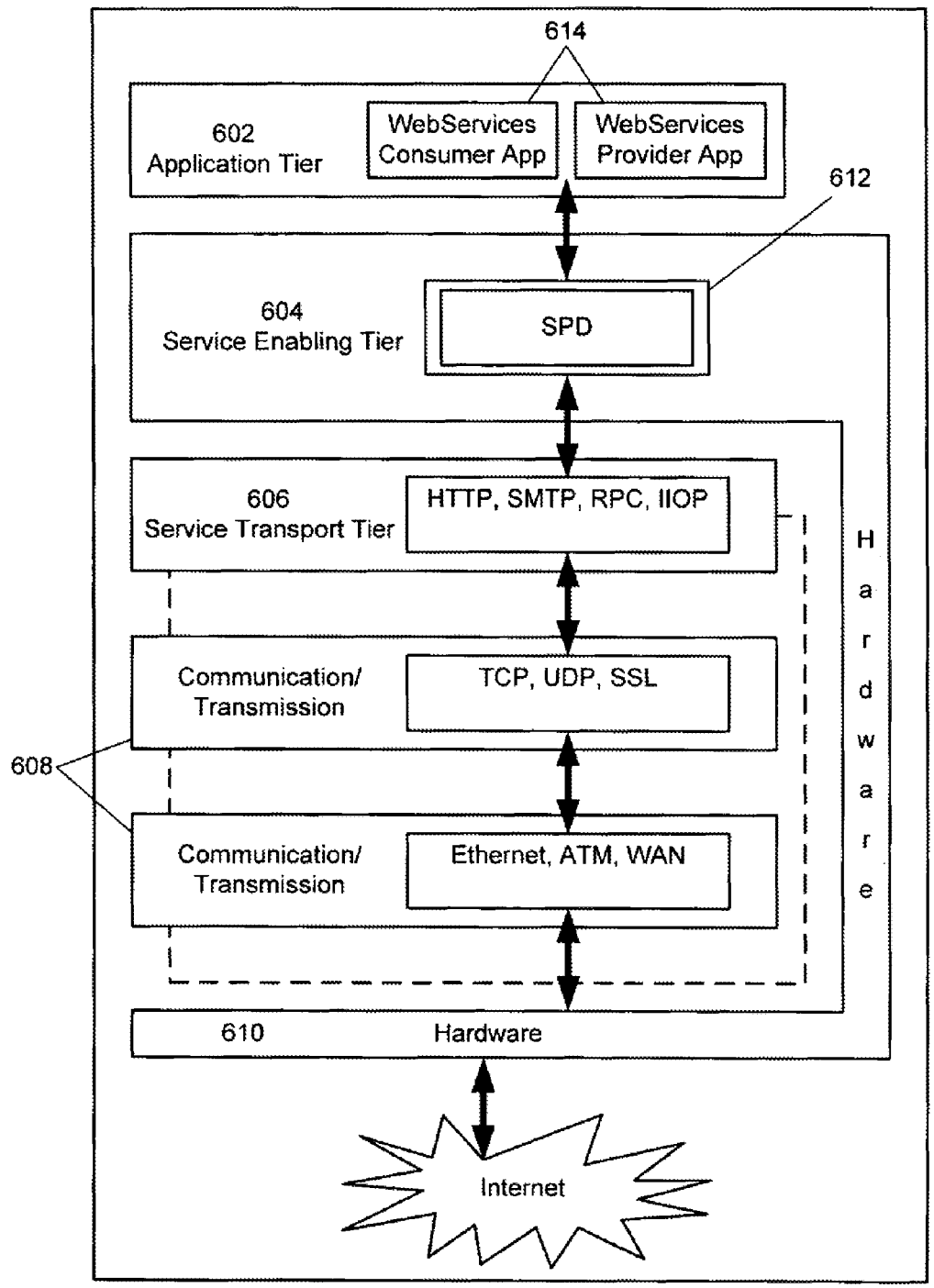
FIG. 6 is a block diagram illustrating the communication layers used to exchange information for web services including a SOAP processing device according to an embodiment of the present invention.

FIG. 6 illustrates the communications layers used to provide web services according to exemplary embodiments of the present invention: an application tier 602, service enabling tier 604, service transport tier 606, communications/transmission tier 608, and hardware tier 610. The service enabling tier 604 is provided in hardware 610 by the SPD 612. Web services applications 614 (in the application tier) make requests to, and receive responses from, the SPD 612. When a request to the SPD 612 is made, the respective message is converted into a SOAP format by the SPD before it is provided to the transport layer 606. When a SOAP message is received from the transport layer 606, it is provided to the SPD 612. The SPD 612 generates the application specific format before the message is sent to the web services application 614. Driver software in the operating system may direct incoming SOAP messages to the SPD 612.

Figure 7:
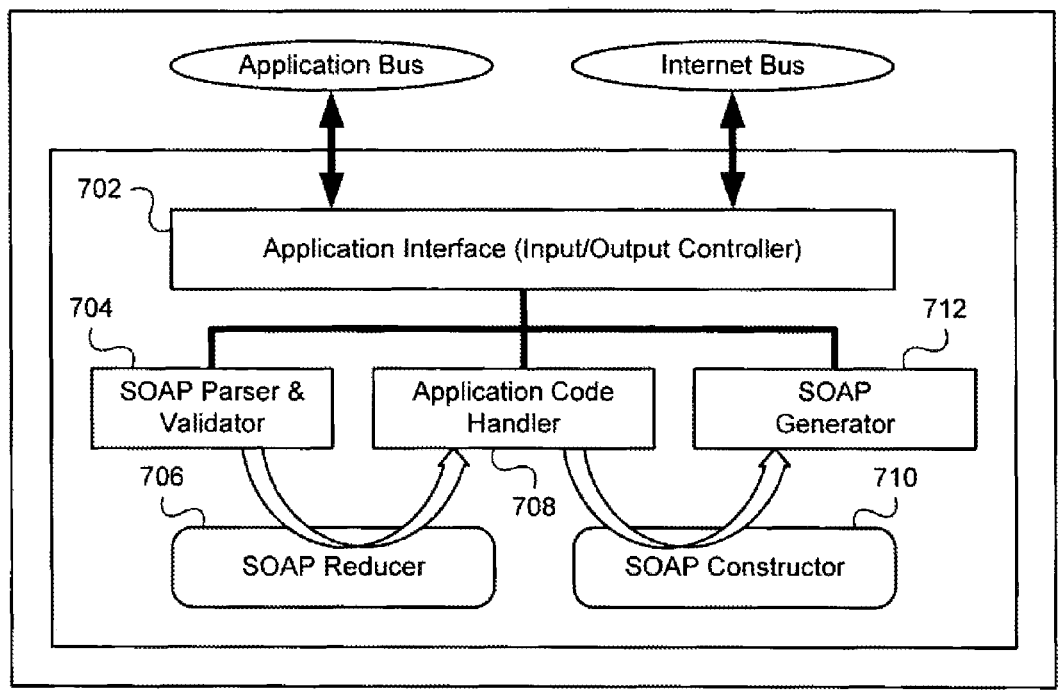
FIG. 7 is a block diagram showing the top-level architecture of a SOAP processing device according to an embodiment of the present invention.

FIG. 7 is a block diagram of the architecture of an exemplary SPD according to an embodiment of the present invention. The SPD in FIG. 7 includes circuitry implementing the following main functional blocks: Application Interface (Input/Output Controller) 702, SOAP Parser & Validator 704, SOAP Reducer 706, Application Code Handler 708, SOAP Constructor 710, and SOAP Generator 712. In addition, the SPD may optionally include embedded memory or have a separate memory associated with the device (such as flash memory, RAM or ROM). The SPD may also access the host memory over the system bus. The functional blocks may be operatively connected to one another over an internal system bus within the IC. This SPD may also include additional functional blocks that may be necessary in aiding the processing of SOAP and/or native input/output. These additional functional blocks may also be suitably connected with the main functional blocks to ensure the functionality of SPD.

The SPD may also include certain pre-configured hardware libraries or "IP Cores" related to any communication specific module in its different embodiments. This may be effected by providing Communications Subsystem Generic Core shown in FIGS. 8 (802) and 9 (902) and also providing specific interface logic that can be modified/selected based on the target device. The Communications Subsystem Generic Core (802, 902) implements interface functionality that is common across system architectures, while the specific interface logic implements the specific interface used in the target device, such as PCI, PCI Express, WAP or other interface. The specific interface logic may be selected when the SPD is designed, so that only a single interface is included in the SPD when it is manufactured. Alternatively, multiple cores could be included and selectively enabled or disabled to operate with different interfaces. In some embodiments, multiple interfaces could be enabled to allow the SPD to operate as a bridge between two different interfaces.

Figure 8:
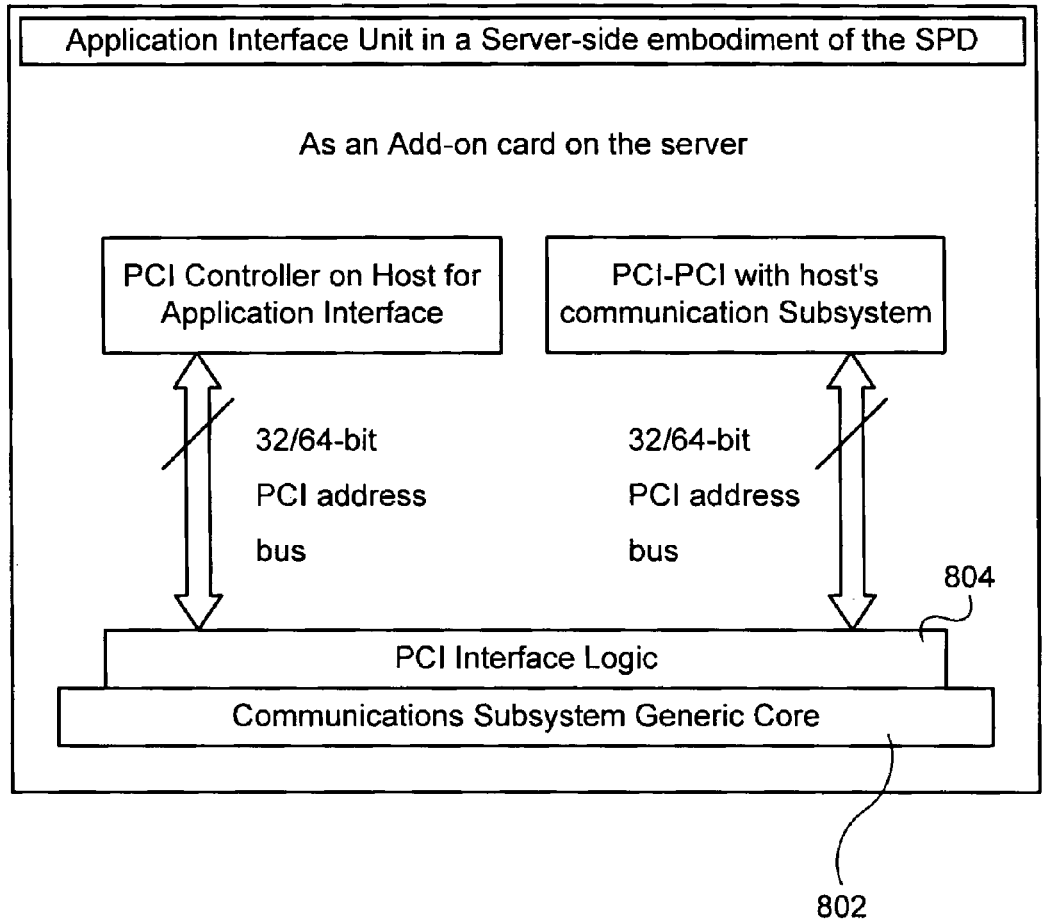
FIG. 8 is a block diagram showing the architecture of an Application Interface Unit according to an exemplary embodiment used on a server.
Figure 9:
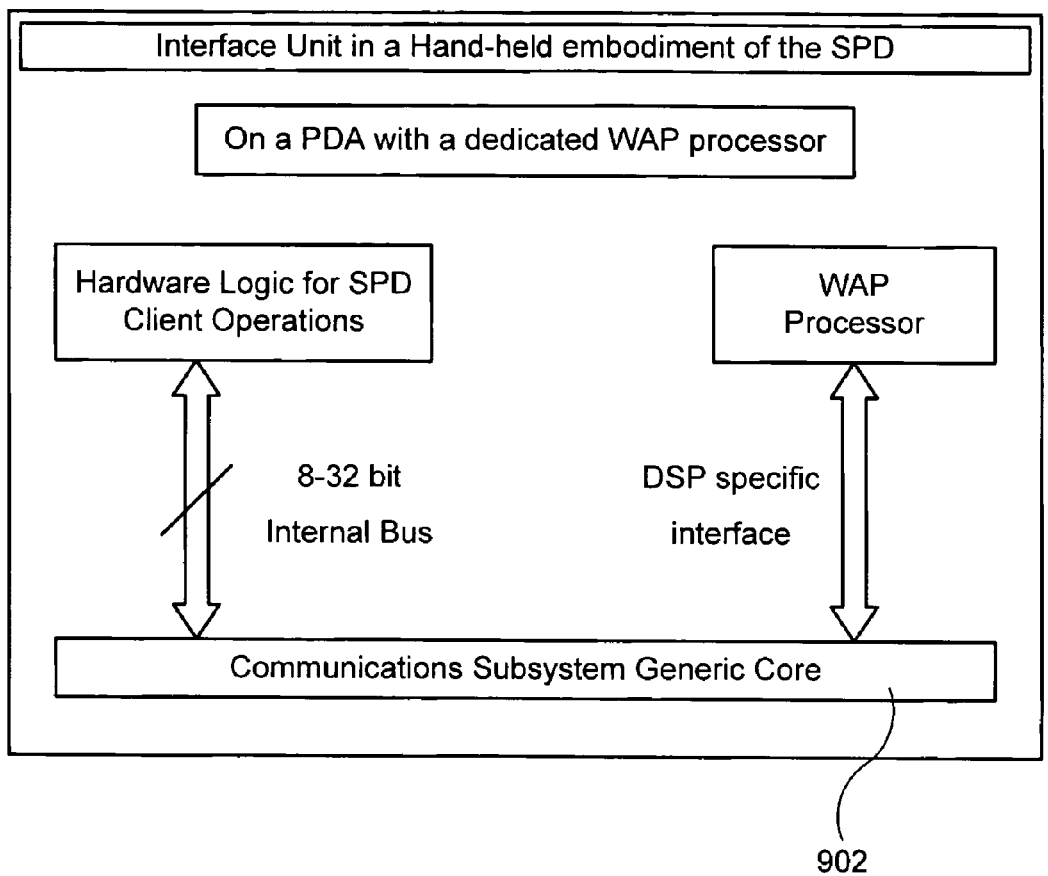
FIG. 9 is a block diagram showing the architecture of an Application Interface Unit according to any exemplary embodiments used on a client.

FIG. 8 shows an example of an embodiment of an Application Interface Unit used in a server with a PCI bus interface 804. Here, the SPD is appropriately "plugged" into a computer system running a dedicated application server. In such embodiment, the SPD may interface through an add-on PCI interface card. FIG. 9 shows an example of another such embodiment where the SPD is embedded in a PDA capable of communicating on the internet. This is an example of a client-side embodiment of an SPD. Interface circuitry that communicates on WAP enabled circuitry on the PDA's hardware is included in the SPD and operates on top of the Communications Subsystem Generic Core 902 as shown in FIG. 9.

Referring to FIG. 7, the Application Interface (Input/Output Controller) 702 provides an interface to the system bus for communication with the application on the host system as well as for communication with the Internet. The interface receives messages over the system bus as well as control signals. In particular, the interface may receive operational codes or control bits to indicate the format of the message (SOAP or a specified application specific format) and what action to take (parse/validate only, generate SOAP message, generate application specific message or other action). The operational codes may also include other codes (such as codes for initialization of the SPD and downloading updated rules or valid grammars for the document for new versions of the SOAP specification or for new application specific formats).

The SOAP Parser & Validator 704 parses a SOAP message and determines whether it is properly formed. The SOAP Parser & Validator 704 checks both the namespaces and its grammar schema for the message. Specific circuitry is provided to perform repetitive functions that are not likely to change from one message to another. For instance, the SPD may include a buffer or local memory for storing the message (or alternatively, the message may be accessed in the host memory). The SOAP Parser & Validator 704 functional block includes circuitry, local buffers, registers and pointers to marshall and unmarshall XML in an efficient manner. The SPD may not handle exception cases directly. However, the driver software may be designed to handle exceptions and/or direct them to alternate application paths. The SOAP Parser & Validator 704 will, at a given instant of time, include circuitry to support the most current version of W3C approved SOAP specification. It will also include circuitry for checking the version of SOAP used in the input. The SPD may also include logic to upgrade the current version support for SOAP, wherein the logic for previously supported stable versions is automatically moved to its memory banks. The memory banks may be supported internally within the SPD or externally in the host device. Whenever an input is received which does not match with any of the SOAP versions supported, an appropriate exception is raised to the driver software, as mentioned above.

In an exemplary embodiment, flash memory (or other memory) may be provided in the SPD or externally (for example, through an external flash memory card). The memory may contain information regarding the SOAP specification and/or a new version of SOAP to update the SPD. The memory may contain, for example, all configurable elements required for SOAP processing, information for WSDL compliance for versions of the W3C standard and W3C standard compatible versions of SOAP and WSDL. Information may also be provided for multiple versions of SOAP. In each case, the SPD may include circuitry to download the information from the memory (for example, a flash card reader interface) for parsing and validation in accordance with the respective protocol. In this way, multiple versions of SOAP and other protocols may be supported and the SPD may be updated by downloading new versions from memory.

The SOAP Reducer 706 breaks a SOAP message up into its constituent elements for processing. Once the SOAP message has been parsed and validated, the SOAP Reducer 706 may also discard elements that are no longer needed (such as the envelope element). Only the elements required to generate an application specific format need to be identified and retained.

Application Code Handler 708 sub functional block comes into play after-or-before the data format conversion has been appropriately handled by the sub functional blocks SOAP-Reducer 706/SOAP-Generator 712/SOAP-Constructor 710/ SOAP Parser & Validator 704. The functionality of this unit is to enable "access to the object" referred to in the SOAP message, from within the SPD. For example, after an incoming SOAP request is received, parsed and validated, the Application Code Handler 708 sub-functional block takes appropriate steps to ensure that the appropriate target object referred to (in the SOAP message) is accessed correctly and the required operation (again mentioned in the SOAP message) is properly executed on it. It uses the SOAP-related sub units to properly package and send the response to the caller.

When the input to the SPD is received from the native application directly, the Application Code Handler 708 ensures that the message is properly dispatched to the appropriate target service and the response is dispatched properly to the caller application.

The SOAP Constructor 710 includes circuitry to construct SOAP elements from the converted elements received from the Application Code Handler 708. The SOAP Generator 712 uses these elements to generate a properly sequenced and formatted SOAP message. The SOAP message includes an envelope containing the message in SOAP format. The SOAP message is then provided through the Application Interface (Input/Output Controller) 702.

In the above exemplary architecture, a message being converted from SOAP to an application specific format is received through the Application Interface (Input/Output Controller) 702, parsed and validated by the SOAP Parser & Validator 704, reduced by the SOAP Reducer 706, converted to application specific format by the Application Code Handler 708 and returned in application specific format through the Application Interface (Input/Output Controller) 702. A message being converted from an application specific format to SOAP format is received through the Application Interface (Input/Output Controller) 702, converted into SOAP elements by the Application Code Handler 708, constructed into SOAP elements by the SOAP Constructor 710, generated in final SOAP format by the SOAP Generator 712 and returned in SOAP format by the Application Interface (Input/Output Controller) 702.

Figure 10:
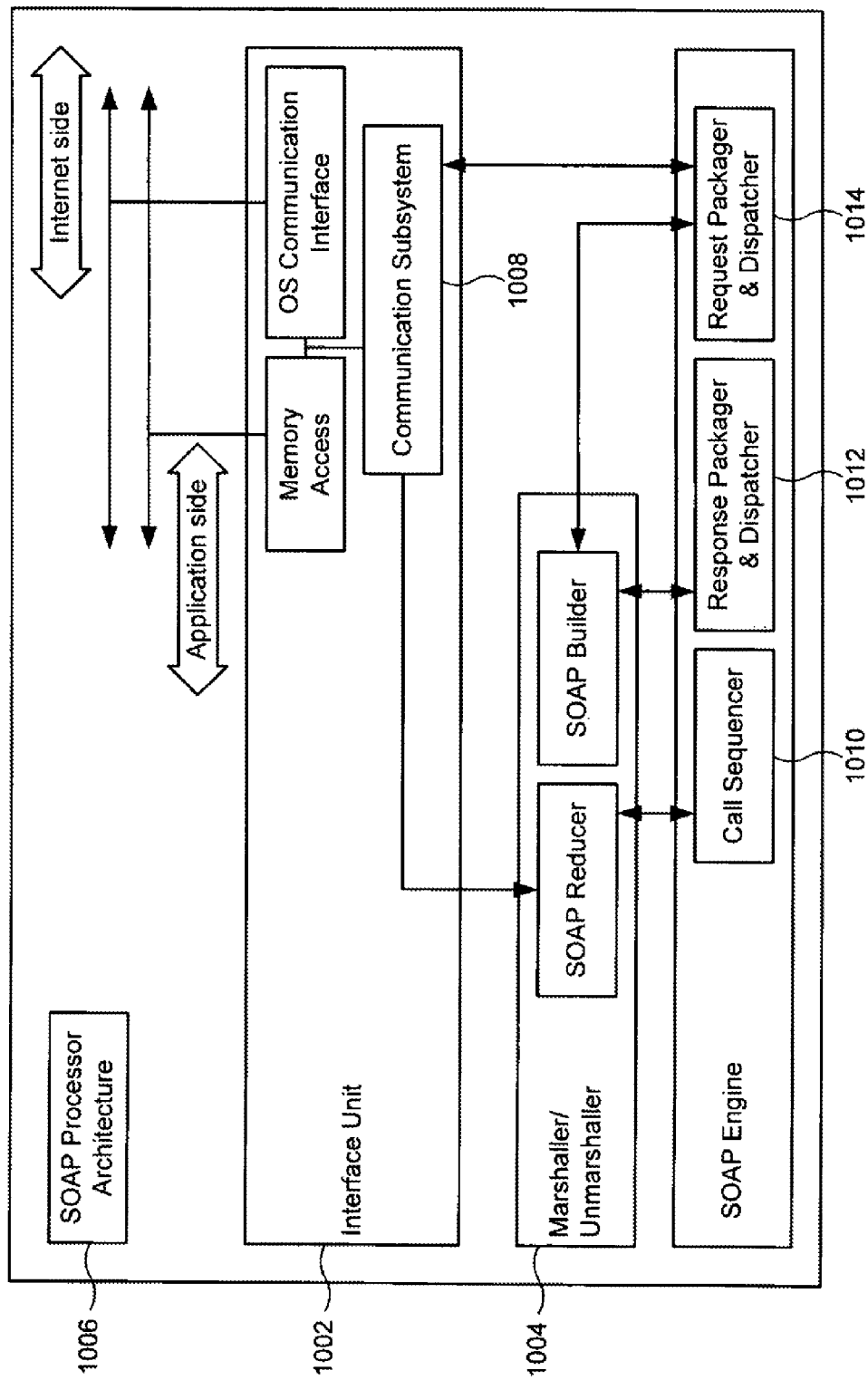
FIG. 10 is a block diagram showing additional details of an architecture of a SOAP processing device according to an embodiment of the present invention.

FIG. 10 is a block diagram showing additional details of the architecture presented in FIG. 7 according to an embodiment of the present invention. It provides the details of the sub-units of the Application Code Handler 708. However, it shows the SOAP-Parser/Validator 704, SOAP-Reducer 706, SOAP-Generator 712 and SOAP-Constructor 710 in the form of a simpler "Marshaller/Unmarshaller Unit" 1002. The mapping between the functional blocks in FIG. 7 and FIG. 10 may be summarized as follows:

a. Application Code Handler 708 in FIG. 7 corresponds to SOAP Engine 1004 in FIG. 10.
b. The blocks SOAP Parser/Validator 704, SOAP Reducer 706, SOAP Generator 712 and SOAP Constructor 710 in FIG. 7 correspond to the Marshaller/Unmarshaller Unit 1002 of FIG. 10.

The SPD in FIG. 10 has the following major circuit blocks: Interface Unit 1006, Marshalling/Unmarshalling Unit 1002 and SOAP Engine 1004. The communication between these blocks is represented by arrows in FIG. 10. This communication may be provided by an internal bus that operatively connects the functional blocks of the device. The SPD of FIG. 10 operates in two primary modes, namely: SOAP Input Mode and Application Specific Input Mode. The roles and responsibilities of these functional blocks are presented in the following sub sections:

Interface Unit 1006. This unit is responsible for communicating with the operating environment. This unit includes circuitry to perform the following main tasks:
1. Receiving the request (either SOAP or application specific) for processing;
2. Dispatching/flagging the availability of processed result;
3. Making other calls that might be necessary for processing the current input; and
4. To switch/choose a transport protocol over which SOAP will be implemented.

This unit may have its own communication sub system 1008 for conversing with the Applications and Communication subsystems of the Operating Environment.

Marshaller/Unmarshaller 1002. "Marshalling" is the terminology used for the process of converting the information from one format to the other format. Likewise, "Unmarshalling" is the terminology used for the reverse process. This unit includes circuitry to construct SOAP/XML documents from the application specific format and vice versa. This unit is designed to accommodate the most recent SOAP specification. It provides appropriate compatibility for various stable earlier versions of SOAP and also a very flexible way of upgrading to a new version. This unit works in close unison with the SOAP engine 1004.

Over and above the XML format conversion functionality, the Marshaller/UnMarshaller Unit 1002 may, optionally, provide circuitry and/or software to decode the WSDL document for information on where and how a web service endpoint has to be reached and transacted. This circuitry and/or software may be built to be self-reliant to support WSDL, as the WSDL document is itself an XML document. This circuitry and/or software provides additional functionality to handle the standardized features of WSDL, and may be implemented in the exemplary embodiment without affecting the rest of the architecture.

SOAP Engine 1004. This unit is the core of the SPD, and the responsibility of this block is to effectuate SOAP handing process. This unit includes circuitry to carry out the following tasks:
1. When the input to the SPD is a SOAP message, it builds up an efficient model of the SOAP message and translates it to an application specific 'call' syntax/sequence. This call sequence may be 'executed' in the SPD itself completely; or partially in the SPD and partially on the host system. 'Execution' of the call sequence results in the actual object access as required by the SOAP-message. Upon forwarding this application specific call, the SOAP engine waits for the response from the application.
2. Receives the response from the application, packages it into an appropriate SOAP response and dispatches it through the Interface Unit.
3. The SOAP Engine's role in the case of application being the originator of a native request would be to orchestrate the following:
    a. package the request in appropriate SOAP request format;
    b. handover the message to the Interface Unit to take the message 'out of the wire';
    c. wait for SOAP-RESPONSE from the target of the message; and
    d. Unpack the received message into result-of-operation to the application.

In an exemplary embodiment, the architecture of the SOAP Engine 1004 may, optionally, provide circuitry and/or software to "pull" the WSDL document by connecting to the appropriate UDDI server. This option may be used when the web service description is not available along with the SPD's input. This may be effected by instructing the Interface Unit to appropriately fetch the document (typically HTTP+SOAP itself) over the network, decoding the WSDL document with the Marshaller/Unmarshaller Unit 1002 and then proceeding on to the SOAP Processing phase.

The SOAP Engine 1004 carries out the above tasks using other sub-functional blocks. The three primary sub-functional blocks are: "Call Sequencer" 1010, "Response Packager and Dispatcher" 1012 and "Request Packager and Dispatcher" 1014. These three sub-functional blocks are described below.

Call Sequencer 1010. The "Call Sequencer" sub-system includes circuitry to build the call to the application on the local system as well as to build the SOAP call sequence for the remote system.

Figure 11:
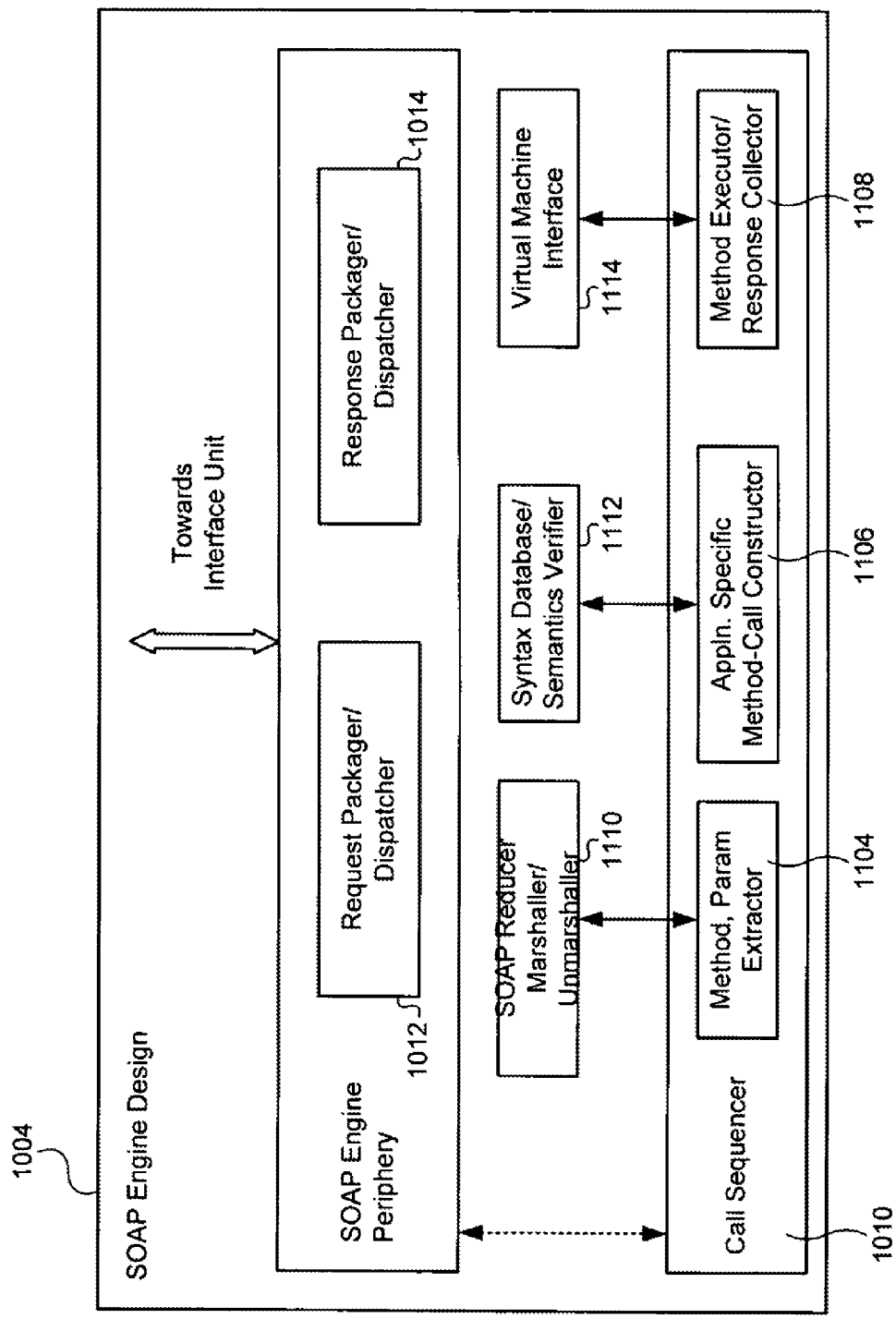
FIG. 11 is the architectural diagram of a SOAP processing device according to an exemplary embodiment.

FIG. 11 depicts a top-level architecture diagram of the SOAP Engine Design 1100 showing aspects of the Call Sequencer 1102. The Call Sequencer unit of the SOAP Engine may be further broken down into the following functional units:
1. Method/Param Extractor 1104
2. Application Specific Method-Call Constructor 1106
3. Method Executor and Response Collector 1108

Method/Param Extractor 1104. This unit ensures that the appropriate SOAP Action (referred to as 'method' here) is extracted from the message with all the required parameters for its successful completion. It works in unison with the Marshaller/Unmarshaller Unit 1110.

Application Specific Method-Call Constructor 1106. Depending upon the target device and/or the operating environment, the SPD selects the correct syntax and semantics of the SOAP Action that will be executed. This unit may include a Syntax Database 1112, from which the appropriate syntax and semantics may be selected. The Syntax Database 1112 may be implemented as a lookup table in an exemplary embodiment. The newly constructed method-call is verified using a built-in Semantics Verifier for the chosen target device/environment in the exemplary embodiment, as shown in FIG. 11.

Method Executor and Response Collector 1108. This unit is responsible for ensuring that the SOAP Action is correctly invoked and executed in the target device/environment. It also ensures that results are captured at the end of the SOAP processing on the target side. The SPD may also include its own internal Virtual Machine 1114, as shown in FIG. 11.

Syntax Database and Semantics Verifier 1112. This unit is responsible for the Syntax/Semantics verification. The implementation of this unit may be a lookup table for a given target device/environment of the SPD in an exemplary embodiment. It may include the instruction set, the calling semantics and any execution-specific arguments or parameters required.

Virtual Machine Interface 1114. In an exemplary embodiment, the SPD may optionally include a Virtual Machine Interface. This unit initiates execution of a call sequence generated by the SPD into the actual method call to be executed on the target device. This is an optional unit and might serve as an 'extensible' design component to interface the SOAP Engine to different type of target devices and environments, where the actual SOAP Action would be executed.

Request Packager and Dispatcher 1012. This sub-system includes circuitry to build appropriate requests to the target application. When the target application is the local system, this sub-system builds a native call to the local application and dispatches it. When the target application is a remote system, it takes care of building a SOAP-request, sends it across to the interface unit, gets the SOAP-response and dispatches the result to the native caller application.

Response Packager & Dispatcher 1014. This sub-system includes circuitry to build an appropriate response to the target application. When the target application is the remote application, this sub-system constructs the SOAP message and dispatches it through Marshaller/Unrnarshaller Unit 1002 and the Interface Unit 1006. When the target application is local, the response is directly sent to the waiting application through the Interface Unit 1006.

Figure 12A:
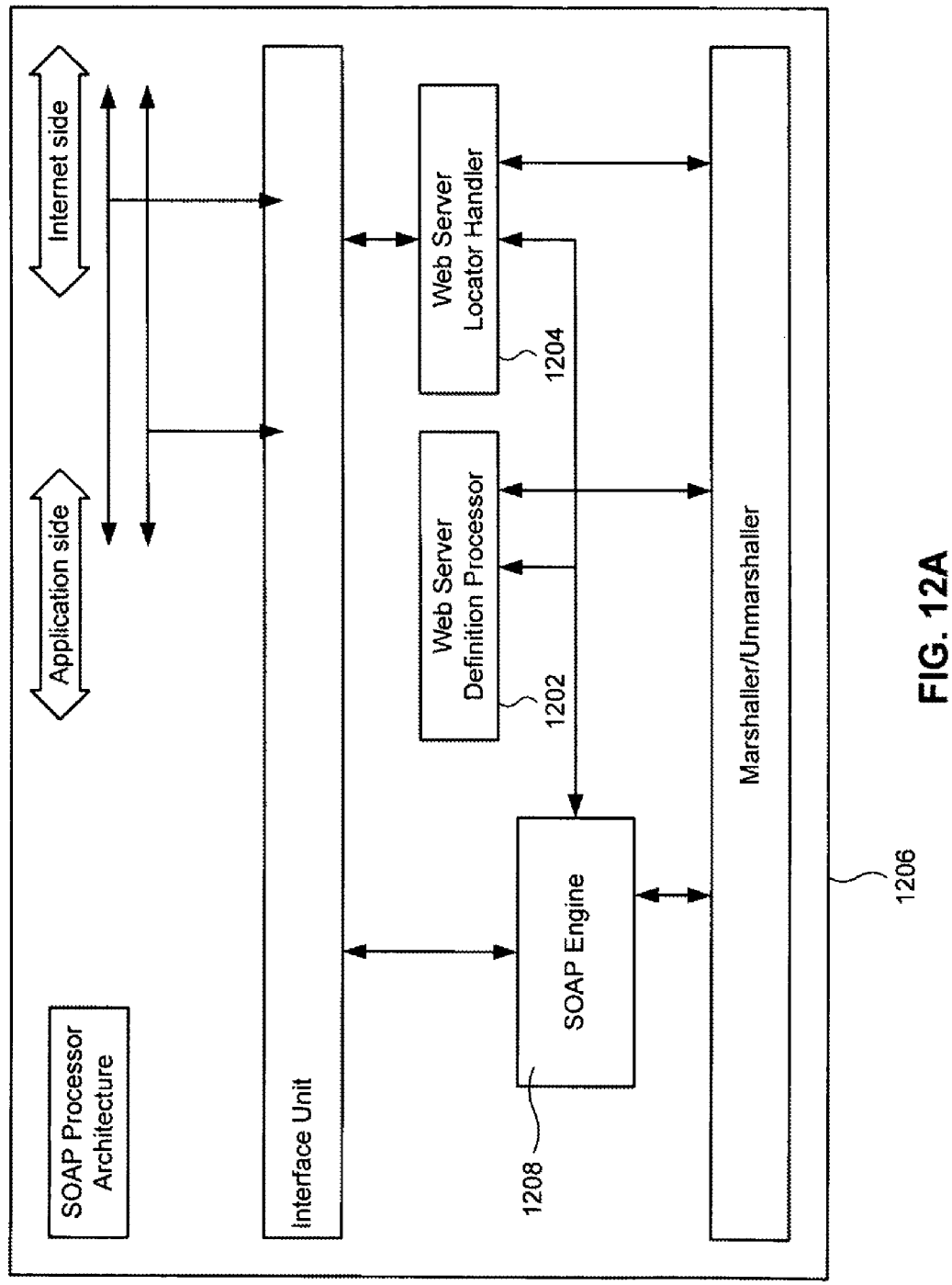
FIG. 12A is a block diagram of a SOAP processing device which includes a Web Service Definition processor and a Web Service Locator according to an exemplary embodiment of the present invention.

In an exemplary embodiment, the SPD might, optionally, contain additional functional sub units such as "Web Service Definition" Processor 1202 and "Web Service Locator" Handler 1204. These functional blocks, if present, interact with the Marshaller/Unmarshaller Unit 1206 and the SOAP Engine 1208. The main communication links for these functional sub units with the Marshaller/Unmarshaller Unit and the SOAP Engine Unit are as shown in FIG. 12A.

Figure 12B:
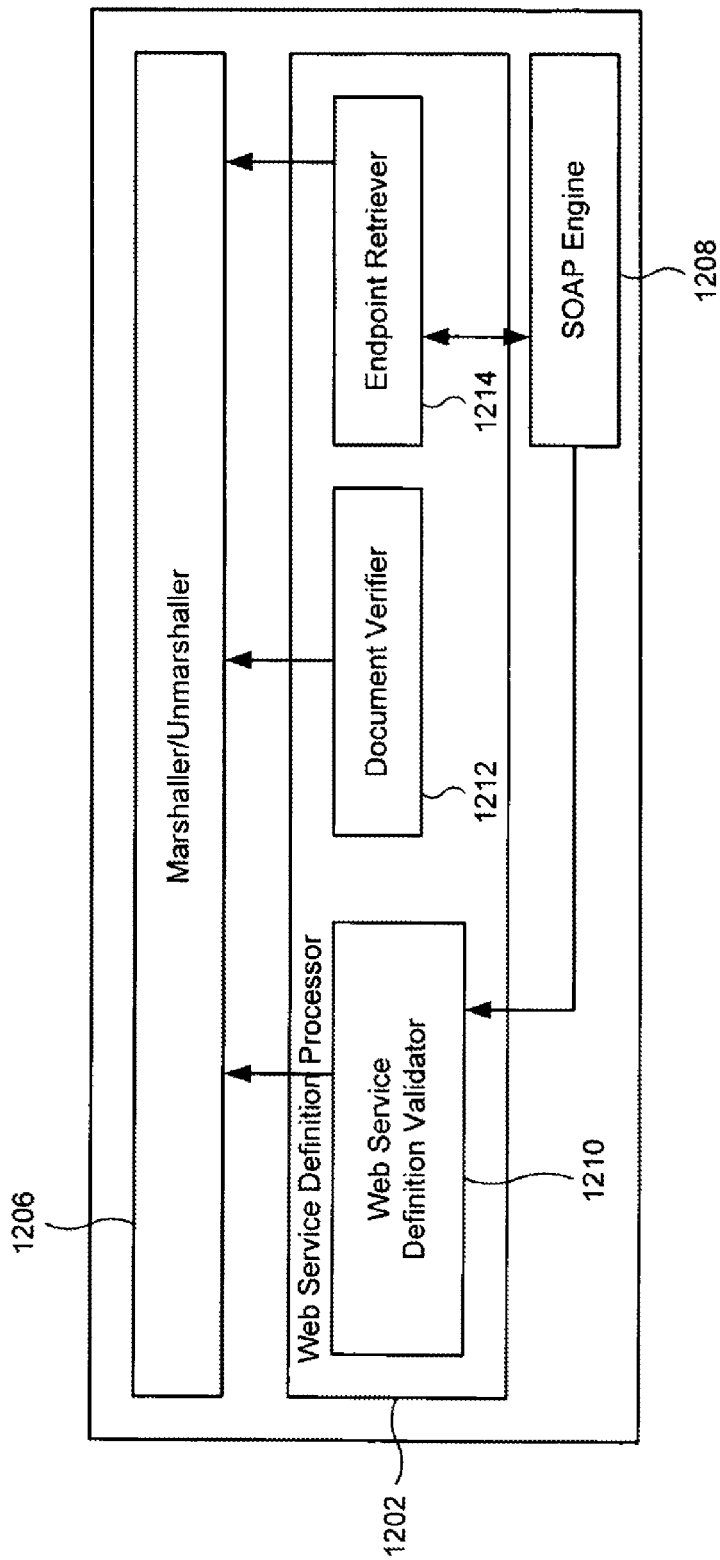
FIG. 12B is a block diagram showing sub units of a Web Service Definition processor according to an exemplary embodiment of the present invention.

The "Web Service Definition" processor 1202 and the "Web Service Locator" handler 1204 functional sub units include all the necessary logic and circuitry for carrying out the verification/validation of the mark-up documents. FIG. 12B shows some details of the functional sub unit "Web Service Definition" processor 1202, for example.

The "Web Service Definition" processor 1202 works closely with the Marshaller/Unmarshaller Unit 1206 and the SOAP Engine 1208. The requirement of the "Web Service Definition" processor 1202 arises when the WSDL document is available for processing. The source of the WSDL document may be the host system or a retrieval by the "Web Service Locator" handler 1204.

The "Web Service Definition" processor 1202 functional sub block has, among the other blocks, three units, namely:
  a. Web Service Definition Validator 1210,
  b. SOAP Document Verifier 1212, and
  c. End point extractor 1214.

Web Service Definition Validator 1210: This functional sub unit contains the logic and circuitry to check and verify the retrieved WSDL document for conformance with the appropriate WSDL specification. This could be implemented by using a look up table, for example. This can also be typically accomplished by running the received document against the standard schema for WSDL documents. The functionality of this unit also includes the verification of the method name (of the web service), parameters and the types of the parameters used in that particular web service.

The "Web Service Definition" processor 1202 works in close unison with the Marshaller/Unmarshaller Unit 1206, as the functionality typically required here is that of the mark up parsing and validation.

The WSDL document includes URL of the web service. This is where an end point is realized, instantiated and available for use. The Web Service Definition processor 1202 returns this "concrete" end point, extracting from the WSDL document with the help of Marshaller/Unmarshaller Unit 1206.

The Web Service Locator Handler 1204, if present, is responsible for supporting the service locating and discovering activities. The main functionalities of this unit are:
  Discovering/Re Discovering Service.
  a. Discovering/Re Discovering end point.

Figure 13:
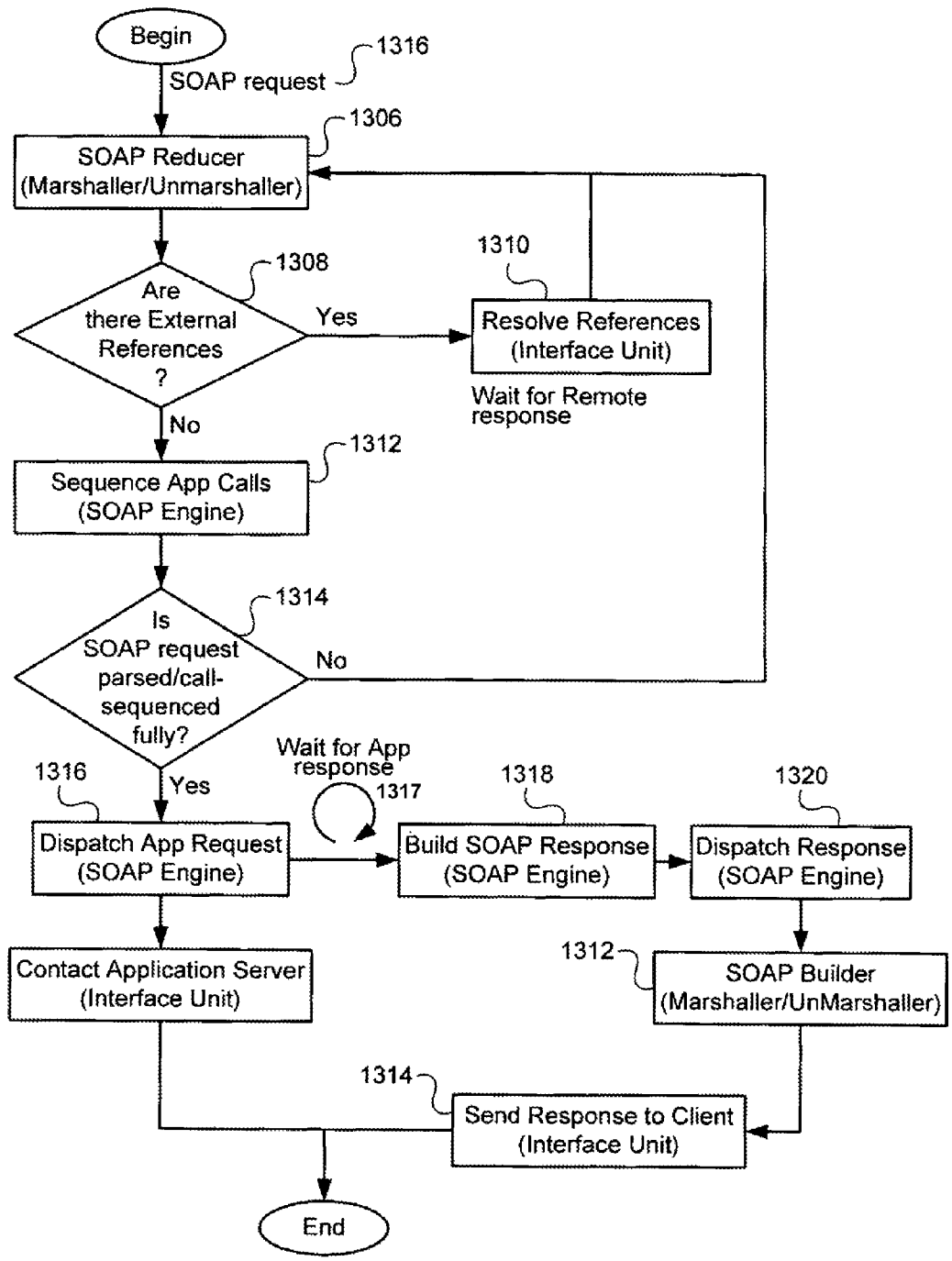
FIG. 13 is a flow chart showing the method of converting a SOAP message to an application specific format and effectuating the operation in a SOAP processing device according to an embodiment of the present invention.
Figure 14:
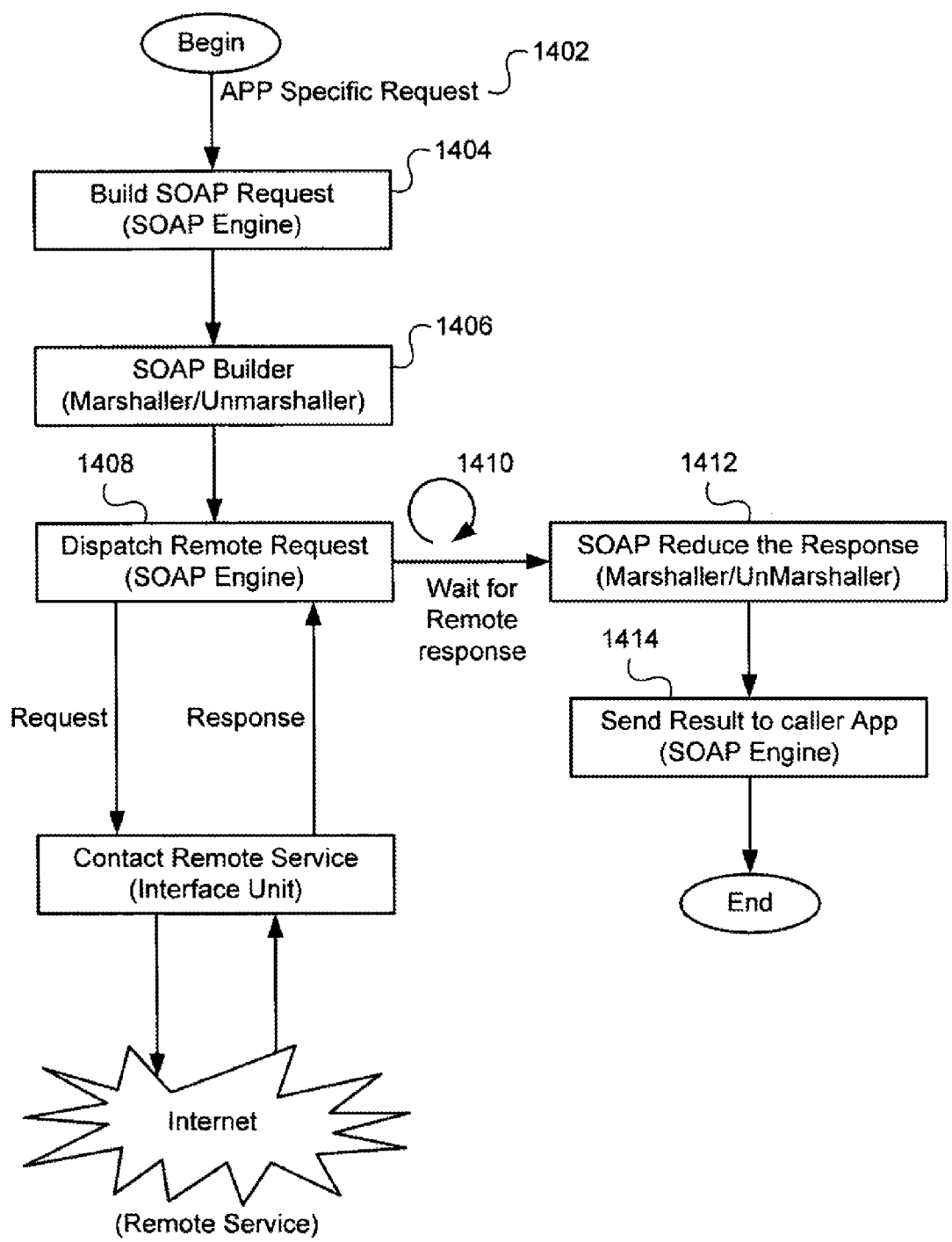
FIG. 14 is a flow chart showing the method of converting an application specific format to a SOAP message in a SOAP processing device according to an embodiment of the present invention.

When the Web Service Locator Handler 1204 is available, the SPD would provide options to configure the location of a Registry (based on UDDI specification) which can provide the location of the required WSDL document for a given SOAP request. This could typically be a configuration value that is downloaded to the SPD device at its boot time FIG. 13 is a flow chart showing the steps for converting a SOAP request to an application specific format in the SPD of FIG. 10. FIG. 14 is a flow chart showing the steps for converting an application specific request to a SOAP format in the SPD of FIG. 10.

The following is the description of the flowchart shown in FIG. 13.

1. The Interface Unit 1006 receives the request 1316. This unit evaluates the input to find out whether it is a SOAP input or not. If it is a SOAP input, then this input is forwarded to the Marshaller/Unmarshaller Unit 1002 as shown at step 1306.
2. The Marshaller/Unmarshaller Unit 1002 reduces the SOAP message to an optimized internal model. External references are resolved as shown at steps 1308 and 1310. A call sequence is built if necessary by the Call Sequencer in close unison with the Marshaller/Unmarshaller 1002 as shown at steps 1312 and 1314.
3. Once this SOAP Call Sequence is ready, the call is made to the application as shown at step 1316. After the call is made, the SOAP engine waits for the response from the application as shown at step 1317.
4. The application, in receipt of the call, accepts the data and works on it and produces the native output. The SOAP Engine receives this output from the application, and it is packaged as a SOAP message as shown at steps 1318 and 1320 and this is forwarded to the Marshaller/Unmarshaller Unit, which builds up a final SOAP response as shown at step 1312.
5. The Marshaller/Unmarshaller Unit then hands over the message to the Interface Unit, which will now forward to the target application as shown at step 1314.

The following is the description of the flowchart shown in FIG. 14.

1. When the application places a request 1402 for a remote service in an application specific format, the Interface Unit 1006 passes it on to the SOAP Engine 1004 as shown at step 1404. The SOAP Engine 1004 uses the Marshaller/Unmarshaller's 1002 capabilities to build a SOAP REQUEST as shown at step 1406 and posts it back to the Interface Unit 1006, but this time indicating that the request has to be dispatched to the remote service as shown at step 1408.

2. SOAP Engine waits for the SOAP-RESPONSE as shown at 1410 and once it is available, converts it to application specific result as shown at 1412 and passes it on to the waiting application as shown at 1414.

Figure 15:
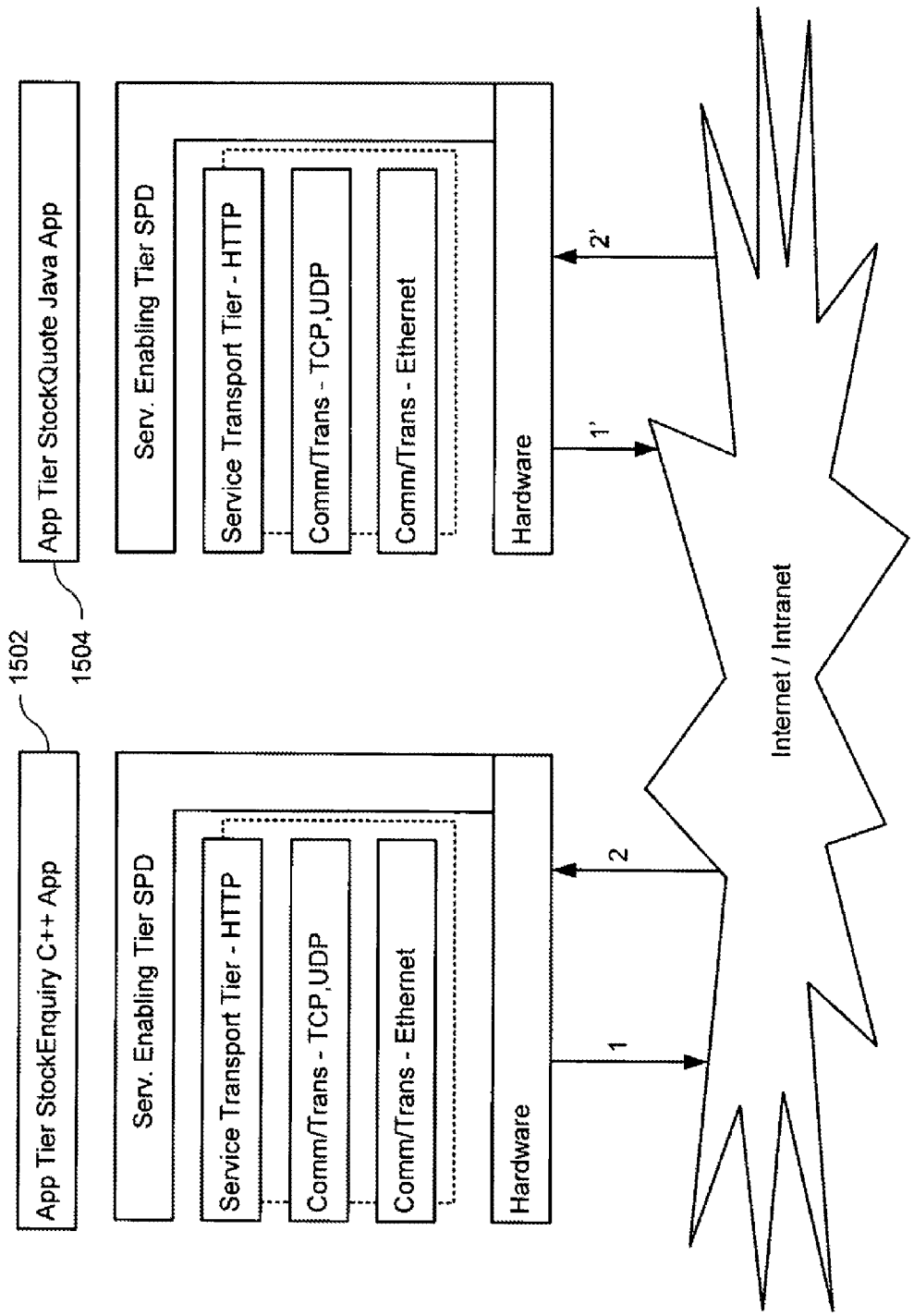
FIG. 15 is a block diagram showing communications between two web services applications using a SOAP processing device according to an embodiment of the present invention.
Figure 16:
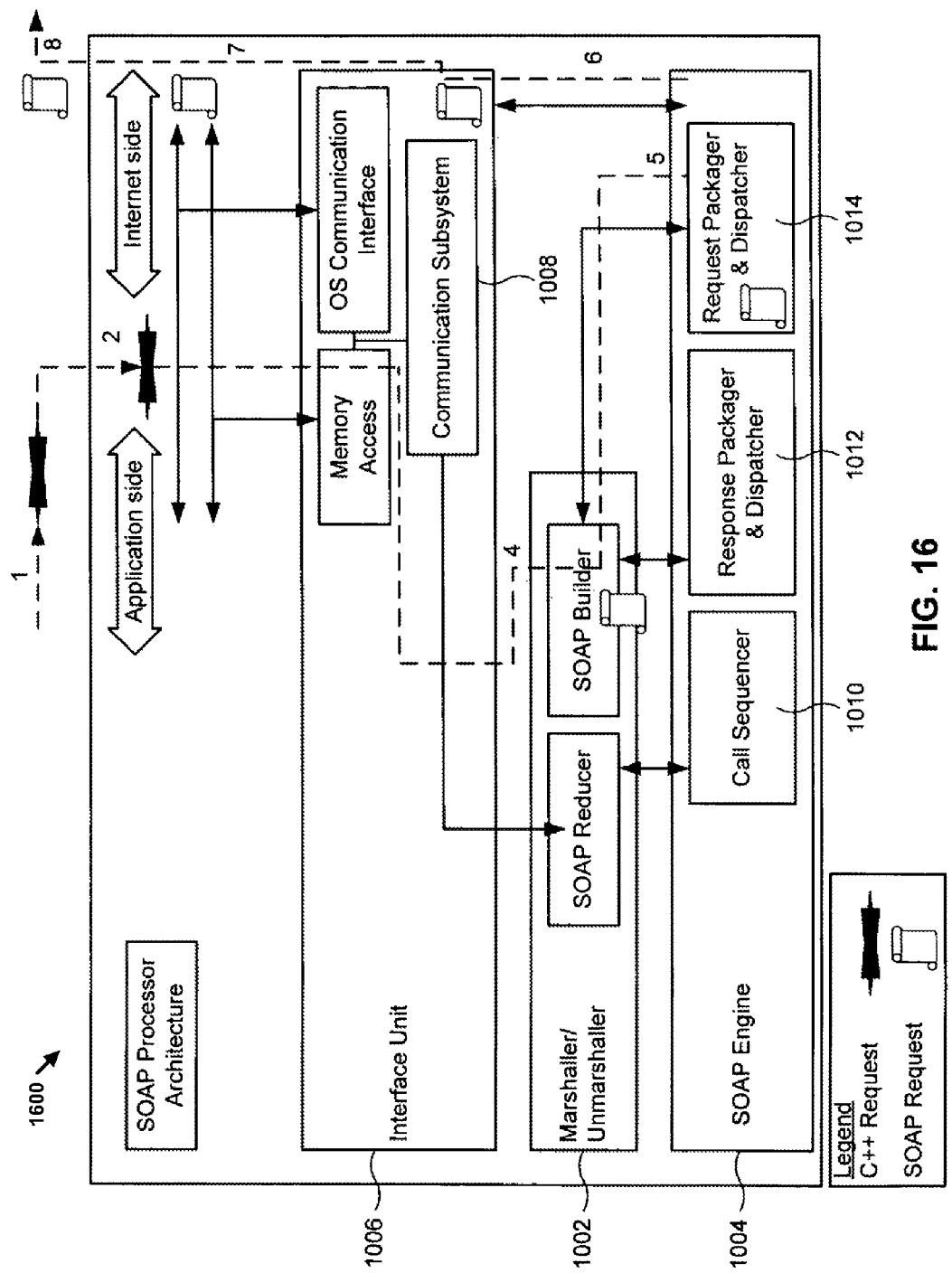
FIG. 16 is a block diagram showing flow of the information through the architecture of a SOAP processing device and the processing flow used to process a C++ request from the web services application shown in FIG. 15 according to an embodiment of the present invention.
Figure 17:
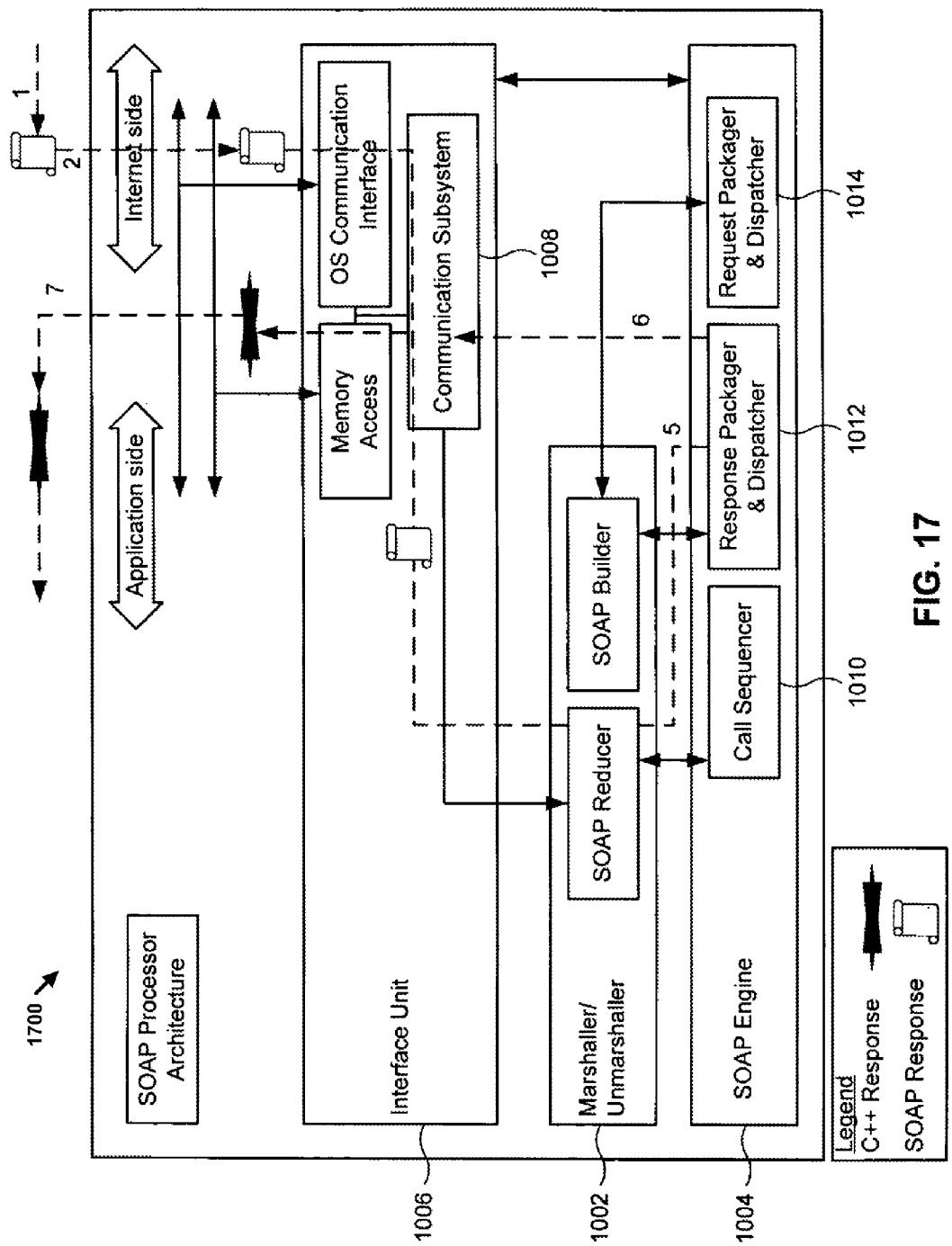
FIG. 17 is a block diagram showing the flow of the information through architecture of a SOAP processing device and the processing flow used to process a SOAP message from the web services application shown in FIG. 15 according to an embodiment of the present invention.

FIGS. 15, 16 and 17 provide a detailed example of the message processing that is carried out in the SPD of FIG. 10. FIG. 15 is a block diagram showing communications between two web services applications. In this example, "Stock Enquiry" 1502 and "Stock Quote" 1504 applications communicate over the internet using SOAP. As shown in FIG. 15, the "Stock Enquiry" application 1502 on the left hand side is, in this example, a C++ application. This is a very simple application, which is designed to send a text corresponding to a Stock Symbol to another application called "Stock Quote" 1504. This application has a function called getStockQuote( ) which sends the Stock symbol as text. This function waits for the response from the "Stock Quote" application 1504. Upon successful execution of the "Stock Quote", the "Stock Enquiry" application 1502 receives a decimal number, which corresponds to the current Stock Price of the Stock Symbol. The "Stock Quote" application 1504 is a Java application. The "Stock Quote" application 1504 receives text input which represents a Stock Symbol and sends the most current price of that Symbol as a decimal number. These applications are illustrated in FIG. 15 in the context of the communications layers used for web services (as described in connection with FIG. 6).

The communication between the two applications is shown with the help of two sets of arrows. The first arrow set is associated with the "Stock Enquiry" application. Arrows distinguished by 1 and 1' is a request by the "Stock Enquiry" application to the "Stock Quote" application. Similarly, Arrows distinguished by 2 and 2' is the response from the "Stock Quote" application.

Below is an explanation of arrows 1 and 2 on the "Stock Enquiry" application 1502 side to explain the how the message changes in each step, within each block of the SPD.

Arrow 1 in FIG. 15 corresponds to:
C++ to SOAP message conversion
Arrow 2 in FIG. 15 corresponds to:
SOAP to C++ message conversion The details of C++ to SOAP and SOAP to C++ conversions at the "StockEnquiry" application 1502 side are described in detail below. It will be understood that the details of Arrow 1' and 2' are similar, so these arrows are not separately described below.

FIG. 16 is a block diagram showing the architecture of a SOAP processing device 1600 and the processing flow used to process a C++ request from the "StockEnquiry" application 1502 shown in FIG. 15. FIG. 16 shows the SPD architecture from FIG. 10 with additional indicia to show the steps and message formats that are used in the various blocks of the SPD during the processing of the C++ request from the "StockEnquiry" application.

FIG. 16 shows 8 steps. These steps are highlighted with dashed lines/arrows. A legend is included to show the conversion.

The invocation of the getStockQuote( ) happens on the application tier of the first system. This is shown by step 1, which is coded as per the legend. The Interface Unit 1006 of the SPD receives this request, as shown by step 2. Here, the SPD checks whether the request is a C++ request or a SOAP request.

This request basically carries a "C++ string", which is the Stock Symbol. In step 3, the subsystem may make additional calls, either to the local system or to a remote system. This is to ensure the appropriate choice of the SOAP processing or any other requirement that demands local or remote input. The Communication Subsystem 1008 of the Interface Unit 1006 will then dispatch this message to the Marshaller/Un-Marshaller Unit 1002, which would start building the SOAP message. This is shown as Step 4. This is an important step. Here, the conversion of the "C++ String", which is the Stock Symbol, to the SOAP String takes place. SOAP String is a built-in datatype (for example, as per "XML Schema Part 2: Datatypes" Specification as described in "Simple Object Access Protocol (SOAP) 1.1" Section 5.2 published on the Web by The World Wide Web Consortium (W3C), May 8, 2000. This datatype is then handed over to the SOAP Engine Unit 1004.

The SOAP Engine Unit 1004 now starts building the SOAP request. This makes use of the Request Packager and Dispatcher subsystem 1014 to build the SOAP request. Here, the engine ensures the SOAP request is properly built as per the SOAP specification(s). This unit may also provide a choice of selecting different specifications that can be used to build the SOAP message. Creating appropriate Envelope element(s), Header element, Body element, Header Entries, Body entries, their appropriate sequencing as per the specifications is taken care of by this SOAP Engine Unit 1004. This is shown by Step 5.

In Step 6, the SOAP Engine 1004 ensures that the SOAP request is layered on top of the appropriate transport protocol and forwards the request to the Interface Unit 1006.

In Step 7, the Interface Unit 1006 examines the SOAP request and then dispatches the same to the remote system.

FIG. 17 is a block diagram showing the architecture of a SOAP processing device 1700 and the processing flow used to process a SOAP message being returned to the "StockEnquiry" application shown in FIG. 15 according to an embodiment of the present invention. FIG. 17 shows the SPD architecture from FIG. 10 with additional indicia to show the steps and message formats that are used in the various blocks of the SPD during the processing of the SOAP message.

FIG. 17 shows 7 steps. These steps are highlighted with dashed lines/arrows. A legend is included to show the conversion. For purposes of this example, we assume that the SOAP request reaches the remote system (System on the right-hand side of FIG. 15) and successfully executes the "Stock Quote" application 1504 on the remote system. The result now reaches the "Stock Enquiry" System 1502, and this is a SOAP response.

The SPD receives the message, as in Step 1. The Interface Unit 1006 examines the message for the type of input and determines that this is a SOAP response, as shown in Step 2. Again, as shown in Step 3, the Interface Unit 1006 communication subsystem may make additional calls to ensure the appropriate choice of the SOAP processing or any other requirement that demands local or remote input. The SOAP message is then forwarded to the Marshaller/Unmarshaller Unit 1002, as shown in Step 4.

The Marshaller/Unmarshaller Unit 1002 now converts the SOAP data to the Application requirement type. In this particular example, the SOAP response contains the Stock Price of the Symbol, which is a "float" type. The Marshaller/Unmarshaller Unit 1002 converts this "SOAP float" type to the "C++ float" type. It is then forwarded to the Response Packager 1012 subsystem, as shown in Step 5.

In the next step, the SOAP Engine Unit 1004 gets the Response Packager 1012 subsystem to forward the result directly to C++ application through the Interface Unit 1006. This is shown in Step 6. In Step 7, the result is forwarded to the local application and the C++ application would receive the "C++ float" data as the response.

The above description also applies to the case where the SPD is used in a "local" setup where the device is used for forward and reverse translations without having to communicate over the internet. This may be the case when messages are sent between applications executing on the same host. In this embodiment, the Interface Unit 1006 may resolve and arbitrate between the request and response mechanisms targeting the host device itself.

Exemplary Business Text Processing (BTP) Embodiment. The following describes a simplified embodiment (referred to as "BTP") that illustrates selected aspects of the present invention in connection with FIGS. 18, 19, 20 and 21. This embodiment illustrates a specific implementation for SOAP text processing without attachments. This simplified embodiment handles only RPC calls (no messaging), interfaces only with SCI and PCI interfaces and does not process binary operations. However, alternate embodiments may support these features.

Figure 18:
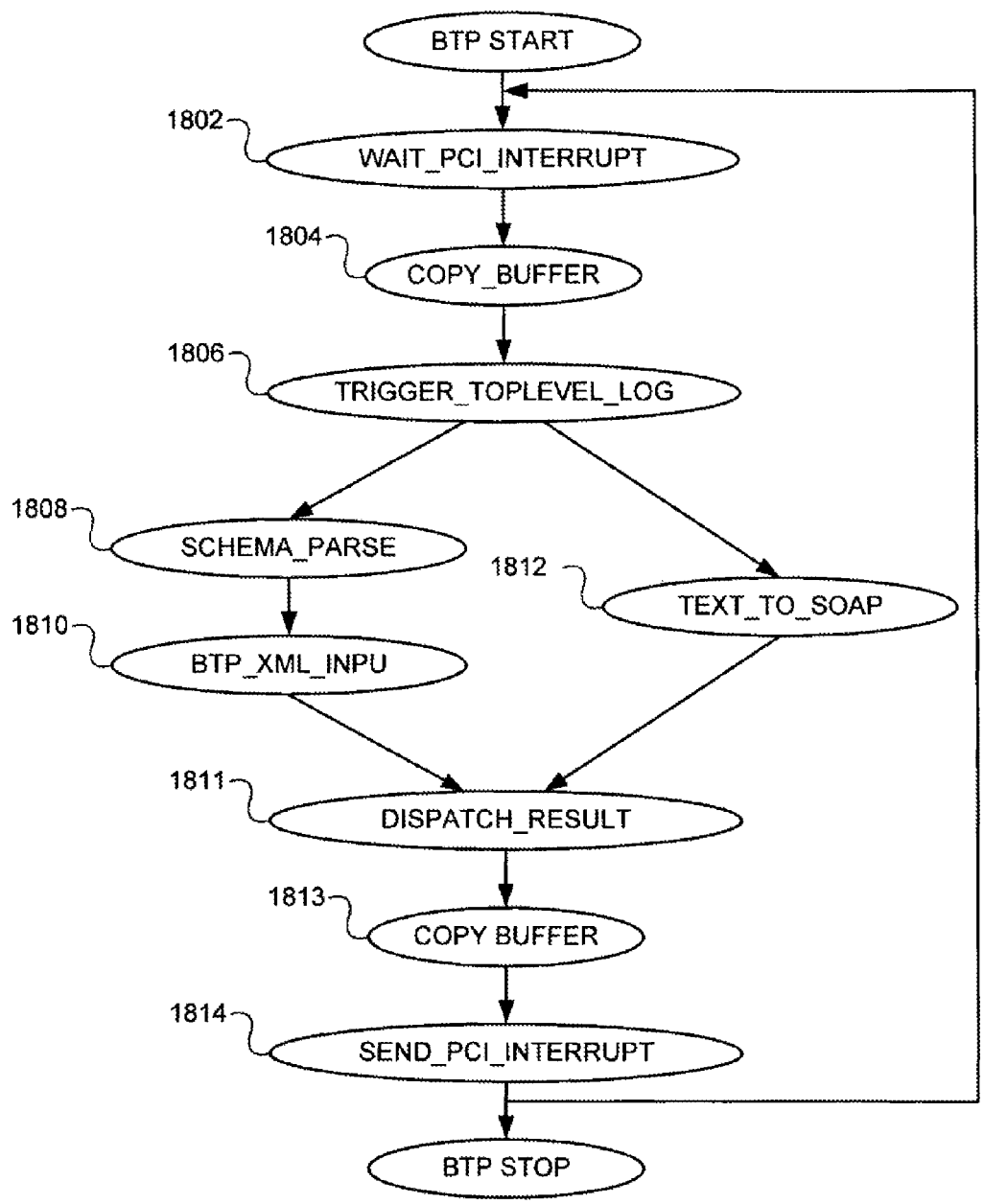
FIG. 18 is a flow chart showing a method of protocol processing according to an exemplary embodiment of the present invention.

FIG. 18 is a flow chart that illustrates the overall operation of the BTP device. In this embodiment, the device is a dedicated board with a PCI interface that can be plugged into a free PCI slot on a computer system. The board uses an AMCC S5935 PCI controller to facilitate communication between the BTP and the computer system. The top level logic is coded in VHDL on a Spartan 2E FPGA with 300K gates.

In this embodiment, the host software first writes the SOAP schema and the SOAP input (for SOAP to Text conversion) into appropriate buffers of the PCI board. It then informs the BTP that input is ready for processing. The BTP waits for indication from the host that data has been made available for it to work on (WAIT_PCI_INTERRUPT 1802).

The BTP then begins by copying this input into its internal buffers (RAM blocks within the FPGA for easier access and speed). This occurs during the COPY_BUFFERS 1804 state shown in FIG. 18. This triggers the top-level logic in the BTP (TRIGGER_TOP_LEVEL_LOGIC 1806) which decides whether the text-to-soap or the soap-to-text VHDL process should be initiated. This decision is made based on the first few characters of the input itself.

Figure 19:
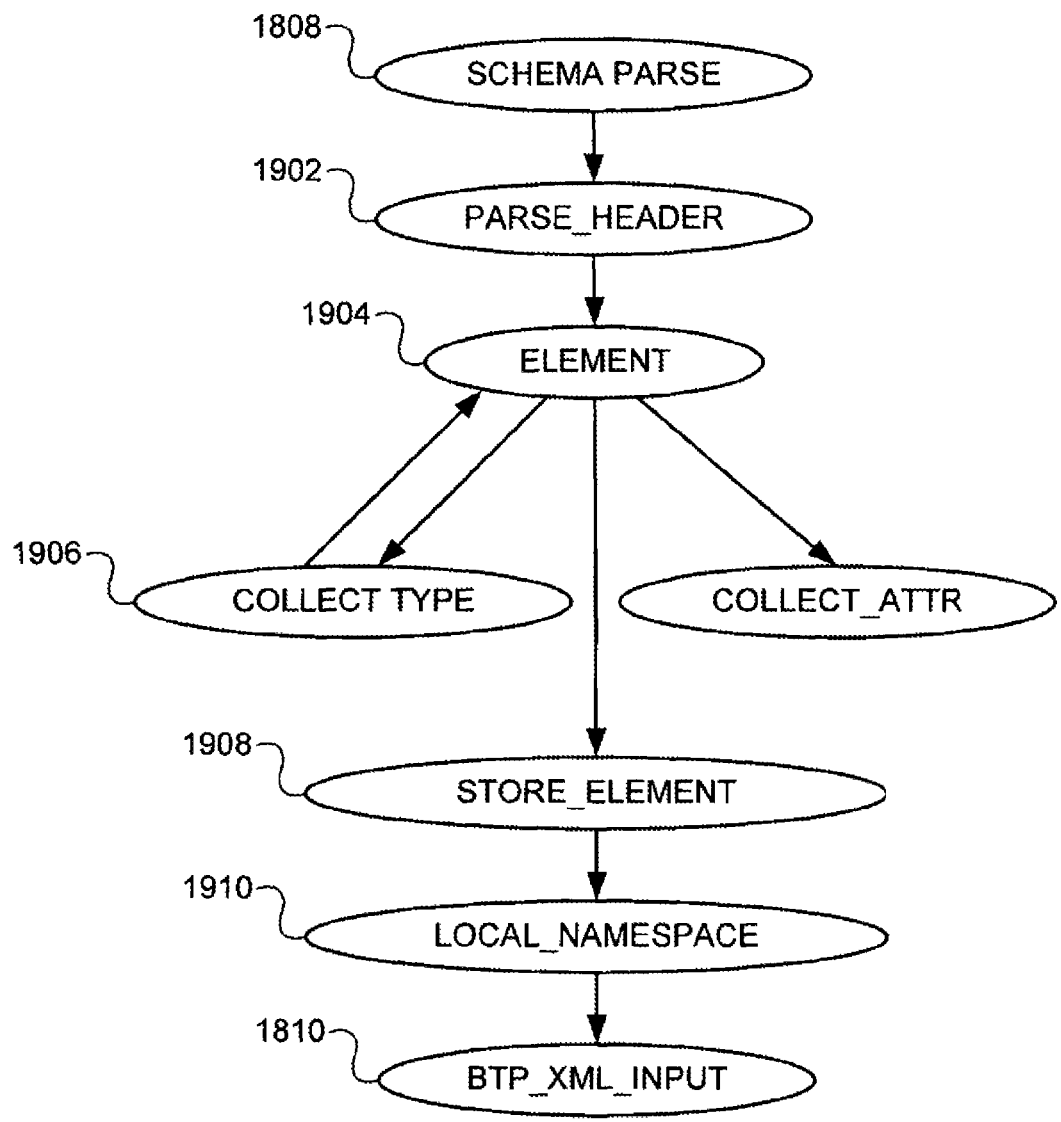
FIG. 19 is a flow chart showing a method of schema parsing according to an exemplary embodiment of the present invention.
Figure 20:
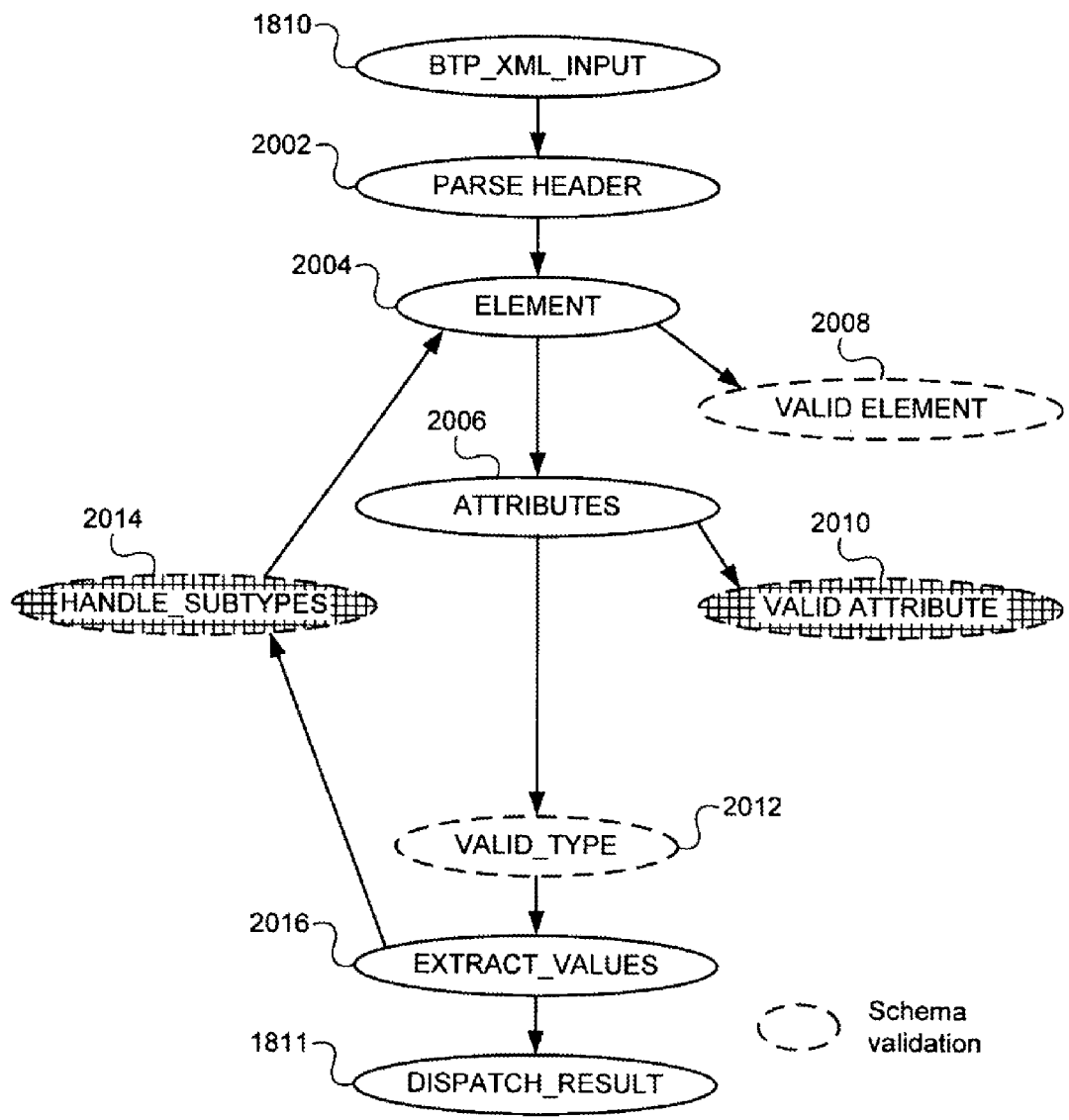
FIG. 20 is a flow chart showing a method of XML parsing and schema validation according to any exemplary embodiment of the present invention.
Figure 21:
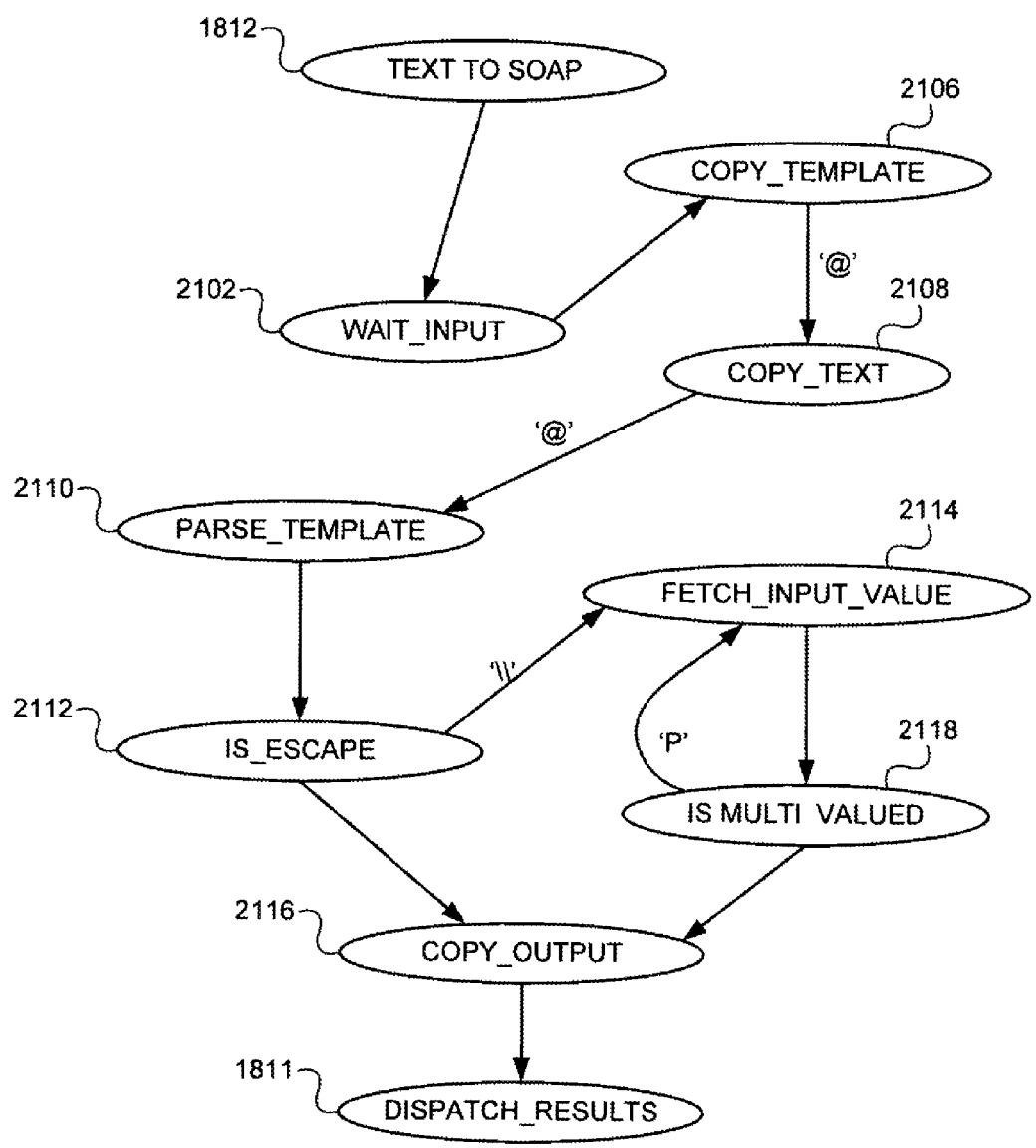
FIG. 21 is a flow chart showing a method of generating a SOAP document according to an exemplary embodiment of the present invention.

FIGS. 19, 20 and 21 show additional information regarding the states SCHEMA_PARSE 1808, BTP_XML_INPUT 1810 and TEXT_TO_SOAP 1812 respectively. Once the results are available from the individual processes, an internal interrupt is sent back to the top-level-logic (DISPATCH_RESULT 1811) and the results are copied to the output buffer of the PCI board (COPY_BUFFER 1813). The size of the output is written to the appropriate register of the AMCC controller and a PCI interrupt is provided to the host (SEND_PCI_INTERRUPT 1814).

The operations of the BTP are brought to a halt by a dedicated interrupt line. As long as the shutdown interrupt is not asserted, the BTP process returns to its default operation or waiting for indication that data is available for processing (WAIT_PCI_INTERRUPT 1802).

FIG. 19 is a state diagram showing the parsing of an XML Schema document in the BTP. The Schema itself is an XML document and is parsed using the XML Parser described in connection with FIG. 20; however, an additional step of collecting and building an internal grammar tree of allowed elements, attributes, and their types as they appear in the XML document is also performed.

Processing starts with the Schema being checked for XML versions, and valid W3C headers (PARSE_HEADER 1902). The true-body of a schema document begins with its element definitions. As soon as the string 'element' (with the appropriate namespace) is seen in the schema (ELEMENT 1904), the parsing engine begins to collect its attributes.

This occurs during the COLLECT_TYPE 1906 state. All elements with simple data types are directly processed. Complex data types are handled by a recursive switch to the ELEMENT 1904 state. Once the complete information about a given element is available, the internal, easily accessible data structure is updated (STORE_ELEMENT 1908). All local namespaces encountered in the schema document are collected separately for easier type processing (LOCAL_NAMESPACES 1910). This process continues until all of the element schema definitions have been processed. The BTP then parses and validates the XML documents (BTP_XML_INPUT 1812) referring to this parsed schema.

FIG. 20 shows a state diagram for parsing an XML document with schema validation, in accordance with the simplified BTP embodiment. This process is triggered after the successful parsing of the schema document (BTP_XML_INPUT state 1810) supplied as one of the inputs to the BTP.

The operation begins with validating supported XML versions, ensuring W3C headers and availability of the schema document (PARSE_HEADER 2002). In the BTP, the schema is made available locally. In alternative embodiments, the schema may be automatically fetched from the internet or other network as necessary. This is the schema against with the rest of the document will be validated.

The body of the XML document is built using a root level element tag (ELEMENT 2004), with associated attributes (ATTRIBUTES 2006). The internal database of elements and their attributes are quickly referred to see if they are legal (VALID_ELEMENT 2008 and VALID_ATTRIBUTE 2010). The trickier sub-types or containment is checked in a separate state (VALID_TYPE 2012). This might need a recursive handling of further elements down the line (HANDLE_SUB-TYPES 2014, ELEMENT 2004 transitions). Once the type has been successfully validated, the values arriving in the XML document against that tag are extracted 2016 and dispatched (DISPATCH_RESULTS 1818).

FIG. 21 shows a state diagram for converting text input to SOAP document in accordance with the simplified BTP embodiment. In this example, a SOAP1.1 envelope is used as the template. Blanks are created in the template using escape sequences and place holder indicators. The application supplies input values that are filled into these blanks and an instance of a SOAP message is generated. The input for translation is supplied as parameters indexed with their corresponding indicators in the template.

The operation starts by waiting for availability of input (WAIT_INPUT 2102 state) from the Interface Unit. The input is a SOAP template and the input values are concatenated and demarcated with the character '@' in a new line of its own. The input is immediately read into internal buffers (COPY_TEMPLATE 2106 and COPY_INPUT 2108).

Conversion begins (PARSE_TEMPLATE 2110) with copying the template as-is into the output zone, as long as the read in ASCII data is not the input indicator escape sequence ('\\'). Once the escape sequence is found (IS_ESCAPE 2112), the indicator key is collected (end of demarcation is the immediate next occurrence of the same escape sequence). The SOAP input zone is now scanned for this key (FETCH_INPUT_VALUE 2114). The value found is transferred to the output zone (COPY_OUTPUT 2116). This operation is repeated until the whole of the template zone has been transferred to the output zone with all input indicators correctly replaced with their corresponding value found in the SOAP input zone. Sometimes, an indicator requires that multiple values be read in from the SOAP input zone (IS_MULTI_VALUED 2118).

As soon as the data is successfully translated to the output zone, an indication is sent to the Interface Unit 1811 and the state machine returns to a wait state as before, waiting for the next conversion call.

While the above embodiments are implemented using ICs or cards, it should be understood that blocks of the SPD may be implemented in software or firmware that is executed by the SPD or a host processor. In some embodiments, a SOAP processor may be implemented as software executing on a host processor. Unlike a conventional SOAP toolkit, however, embodiments of the present invention may accept input from multiple disparate applications using different application specific formats. The SOAP processing software may support multiple application specific formats and thereby provide a common SOAP processor across multiple applications. The SOAP processor may be implemented as object code resident in the host system memory or in a peripheral card or device, which call provide SOAP processing for separate applications without requiring compilation or modification for different types of applications on the host system.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A device for converting a message from a Simple Object Access Protocol (SOAP) format to an application specific format comprising:
    circuitry for receiving the message in the SOAP format and for providing the message in the application specific format;
    circuitry for determining whether the message is in the SOAP format or the application specific format;
    circuitry for performing reduction operations when converting the message from the SOAP format into the application specific format, comprising:
        breaking up the message in the SOAP format into elements;
        discarding those elements that are not required to generate the application specific format; and
        retaining those elements that are required to generate the application specific format; and
    circuitry for converting the message from the SOAP format into the application specific format using, at least in part, the retained elements required to generate the application specific format;
    wherein the device is a custom integrated circuit SOAP processing device (SPD) comprising the circuitry for receiving, the circuitry for determining, the circuitry for performing, and the circuitry for converting, wherein the custom integrated circuit SPD is connected internally to a computer system, and wherein the custom integrated circuit SPD further comprises:
        circuitry for determining whether the message is in an unsupported SOAP format that is not supported by the custom integrated circuit SPD; and
        when the message is in the unsupported SOAP format that is not supported by the custom integrated circuit SPD, circuitry for sending the message to software running on the computer system for converting the message from the SOAP format into the application specific format;
    wherein the custom integrated circuit SPD is configured to accelerate SOAP processing operations, including the receiving the message, the determining SOAP format or application specific format, the performing reduction operations, and the converting the message; and
    wherein the custom integrated circuit SPD comprises local buffers and registers.

2. The device of claim 1, further comprising circuitry for handling all XSD data types.

3. The device of claim 1, further comprising circuitry for selectively making a procedure call to a local application and for selectively making a procedure call to a remote application.

4. The device of claim 1, further comprising circuitry for dispatching the message in the application specific format to a local application.

5. The device of claim 1 further configured for converting a message from an application specific format to a SOAP format comprising:
    circuitry for receiving the message in the application specific format and for providing the message in the SOAP format;
    circuitry for converting elements in the message from the application specific format into the SOAP format;
    circuitry for creating an envelope element, header element, body element, header entry and body entry from the elements converted from the message in the application specific format; and
    circuitry for sequencing and constructing the message in the SOAP format using the envelope element, the header element, the body element, the header entry and the body entry.

6. The device of claim 5, further comprising circuitry for handling a plurality of different schema.

7. The device of claim 5, further comprising an interface to flash memory.

8. The device of claim 5, further comprising circuitry for determining whether a message complies with a SOAP protocol, a flash memory containing information regarding the SOAP protocol and circuitry for downloading the information from the flash memory.

9. The device of claim 8, wherein the information contained in the flash memory includes information regarding WSDL compliance for versions of the W3C standard.

10. The device of claim 8, wherein the information contained in the flash memory includes information regarding W3C standard compatible versions of SOAP and WSDL.

11. The device of claim 5, further comprising circuitry for selecting among multiple versions of SOAP and circuitry for determining whether a message complies with the selected version of SOAP.

12. The device of claim 5, further comprising circuitry for discovering a web service endpoint in accordance with UDDI.

13. The device of claim 5, further comprising circuitry for selectively making a procedure call to a local application and for selectively making a procedure call to a remote application.

14. The device of claim 5, further comprising circuitry for generating a target device specific SOAP call sequence.

15. The device of claim 14, further comprising circuitry for executing the SOAP call sequence on the target device.

16. The device of claim 5, further comprising circuitry for dispatching the message in the SOAP format to a remote application.

17. The device of claim 5, further comprising circuitry for switching the underlying transport protocols over which SOAP is implemented.

18. The device of claim 5, further comprising bus interface circuitry for communicating with a host processor.

19. The device of claim 1, wherein the custom integrated circuit SPD is connected to a peripheral system bus of the computer system.

20. The device of claim 19, wherein the custom integrated circuit SPD is connected to the peripheral system bus as an add-on Peripheral Component Interconnect (PCI) or PCI Express interface card.

21. A system comprising:
a host processor;
a custom integrated circuit device comprising local buffers and registers, wherein the custom integrated circuit device is a custom integrated circuit SOAP processing device (SPD) that is connected internally to the system as an add-on peripheral card;
a first application capable of being executed by the host processor, wherein the first application uses a first application specific format;
a second application capable of being executed by the host processor, wherein the second application uses a second application specific format;
wherein the custom integrated circuit SPD comprises circuitry configured for:
receiving a message in Simple Object Access Protocol (SOAP) format;
determining whether the message is addressed to the first application or the second application;
selectively translating the message from SOAP format into the first application specific format; and
selectively translating the message from SOAP format into the second application specific format;
wherein the selectively translating the message from SOAP format into the first and second application specific format comprises:
breaking up the message in SOAP format into elements;
discarding those elements that are not required to generate the first and second application specific format; and
retaining those elements that are required to generate the first and second application specific format; and
wherein the custom integrated circuit SPD further comprises:
circuitry for determining whether the message is in an unsupported SOAP format that is not supported by the custom integrated circuit SPD; and
when the message is in the unsupported SOAP format that is not supported by the custom integrated circuit SPD, circuitry for sending the message to software running on the host processor for converting the message from the SOAP format into the to the first and second application specific formats;
wherein the custom integrated circuit SPD is configured to accelerate SOAP processing operations, including the receiving, the determining, the selectively translating, the breaking up, the discarding, and the retaining.

22. The system of claim 21 wherein the custom integrated circuit device comprises circuitry configured for:
receiving a message from the first application and the second application;
determining whether the message is in the first application specific format or the second application specific format;
selectively translating the message from the first application specific format into the SOAP format; and
selectively translating the message from the second application specific format into the SOAP format.

23. A device for processing Simple Object Access Protocol (SOAP) messages, the device comprising:
circuitry implementing an application interface controller configured for receiving a first message to be converted from SOAP to an application specific format;
circuitry implementing a parser and validator configured for determining whether the first message is properly formatted, including checking namespace and grammar schema of the first message;
circuitry implementing a reducer configured for receiving a plurality of elements of the first message from the parser and validator, discarding those elements of the plurality of elements that are not required to generate the application specific format of the first messages, and retaining those elements of the plurality of elements that are required to generate the application specific format of the first messages; and
circuitry implementing an application code handler configured for receiving the elements required to generate the application specific format of the first message from the reducer and converting the elements required to generate the application specific format into the application specific format;
wherein the application specific format of the first message is returned by the application code handler via the application interface controller:,
wherein the device is a custom integrated circuit SOAP processing device (SPD) comprising the circuitry implementing the application interface controller, the parser, the reducer, and the application code handler, wherein the custom integrated circuit SPD is connected internally to a computer system, and wherein the custom integrated circuit SPD further comprises:
circuitry for determining whether the first message is in an unsupported SOAP format that is not supported by the custom integrated circuit SPD; and
when the message is in the unsupported SOAP format that is not supported by the custom integrated circuit SPD, circuitry for sending the first message to software running on the computer system for converting the first message from the SOAP format into the application specific format;
wherein the custom integrated circuit SPD is configured to accelerate SOAP processing operations implemented by the custom integrated circuit SPD; and
wherein the custom integrated circuit SPD comprises local buffers and registers.

24. The device of claim 23, wherein the circuitry implementing the application interface controller is further configured for receiving a second message to be converted from an application specific format to SOAP, and wherein the circuitry implementing the application code handler is further configured for converting the second message into elements, the device further comprising:

circuitry implementing a constructor configured for receiving the elements of the second message from the application code handler and constructing SOAP elements; and circuitry implementing a generator configured to receive the SOAP elements from the constructor and generate a SOAP message from the SOAP elements, the SOAP message comprising an envelope containing the second message in SOAP format;

wherein the SOAP message is returned via the application interface controller.

* * * * *